US010855830B2

(12) United States Patent
Tseng et al.

(10) Patent No.: US 10,855,830 B2
(45) Date of Patent: *Dec. 1, 2020

(54) NOTIFICATION OF MOBILE DEVICE EVENTS

(71) Applicant: Google LLC, Mountain View, CA (US)

(72) Inventors: Erick Tseng, San Francisco, CA (US); Dianne K. Hackborn, Mountain View, CA (US); Daniel Fridgren, Malmo (SE); Per Claes Olof Grimberg, Malmo (SE); Joseph M. Onorato, Cambridge, MA (US); German W. Bauer, San Jose, CA (US); Jeffrey D. Yaksick, Mount Hamilton, CA (US); Christopher J. DeSalvo, Seattle, WA (US)

(73) Assignee: Google LLC, Mountain View, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/036,681

(22) Filed: Jul. 16, 2018

(65) Prior Publication Data

US 2019/0075199 A1 Mar. 7, 2019

Related U.S. Application Data

(63) Continuation of application No. 14/942,066, filed on Nov. 16, 2015, now Pat. No. 10,027,793, which is a (Continued)

(51) Int. Cl.
*H04M 1/725* (2006.01)
*G06F 3/0488* (2013.01)
(Continued)

(52) U.S. Cl.
CPC ...... *H04M 1/72552* (2013.01); *G06F 3/0481* (2013.01); *G06F 3/0488* (2013.01);
(Continued)

(58) Field of Classification Search
None
See application file for complete search history.

(56) References Cited

U.S. PATENT DOCUMENTS 5,473,745 A 12/1995 Berry et al.
5,565,888 A 10/1996 Selker
(Continued)

FOREIGN PATENT DOCUMENTS

CN 1816080 A 8/2006
EP 1434411 A1 6/2004
(Continued)

OTHER PUBLICATIONS

Office Action and Search Report, and translation thereof, from counterpart Brazilian Application No. PI0906968-2, dated Sep. 26, 2019, 6 pp.

(Continued)

*Primary Examiner* — Ryan F Pitaro
(74) *Attorney, Agent, or Firm* — Shumaker & Sieffert, P.A.

(57) ABSTRACT

A computer-implemented user notification method includes displaying, in a status area near a perimeter of a graphical interface, a notification of a recent alert event for a mobile device, receiving a user selection in the status area, and in response to the receipt of the user selection, displaying, in a central zone of the graphical interface, detail regarding a plurality of recent messaging events for the mobile device.

20 Claims, 13 Drawing Sheets

Related U.S. Application Data continuation of application No. 13/349,371, filed on Jan. 12, 2012, now Pat. No. 9,191,486, which is a continuation of application No. 12/363,325, filed on Jan. 30, 2009, now Pat. No. 9,154,606.

(60) Provisional application No. 61/024,869, filed on Jan. 30, 2008.

(51) Int. Cl.
   *H04W 4/12* (2009.01)
   *G06F 3/0481* (2013.01)
   *H04W 4/50* (2018.01)

(52) U.S. Cl.
   CPC ......... *H04M 1/72544* (2013.01); *H04W 4/12* (2013.01); *H04W 4/50* (2018.02)

(56) References Cited

U.S. PATENT DOCUMENTS

| | | |
|---|---|---|
| 5,657,049 A | 8/1997 | Ludolph et al. |
| 5,664,128 A | 9/1997 | Bauer |
| 5,736,974 A | 4/1998 | Selker |
| 5,959,621 A | 9/1999 | Nawaz et al. |
| 6,011,550 A | 1/2000 | Capps et al. |
| 6,133,898 A | 10/2000 | Ludolph et al. |
| 6,169,911 B1 | 1/2001 | Wagner et al. |
| 6,173,316 B1 | 1/2001 | De Boor et al. |
| 6,201,525 B1 | 3/2001 | Janney |
| 6,664,983 B2 | 12/2003 | Ludolph |
| 6,757,002 B1 | 6/2004 | Oross et al. |
| 6,850,255 B2 | 2/2005 | Muschetto |
| 6,850,781 B2 | 2/2005 | Goto |
| 6,868,283 B1 | 3/2005 | Bonansea et al. |
| 7,030,837 B1 | 4/2006 | Vong et al. |
| 7,249,326 B2 | 7/2007 | Stoakley et al. |
| 7,250,955 B1 | 7/2007 | Beeman et al. |
| 7,603,458 B1 | 10/2009 | Sexton et al. |
| 7,782,319 B2 | 8/2010 | Ghosh et al. |
| 7,925,305 B2 | 4/2011 | Honda |
| 7,996,045 B1 | 8/2011 | Bauer et al. |
| 8,055,444 B2 | 11/2011 | Salay et al. |
| 8,120,586 B2 | 2/2012 | Hsu et al. |
| 8,249,664 B1 | 8/2012 | Bauer et al. |
| 8,487,883 B2 | 7/2013 | Kao et al. |
| 8,527,011 B1 | 9/2013 | Bauer et al. |
| 8,650,510 B2 | 2/2014 | Goertz |
| 9,154,606 B2 | 10/2015 | Tseng et al. |
| 9,191,486 B2 | 11/2015 | Tseng et al. |
| 10,027,793 B2 | 7/2018 | Tseng et al. |
| 2001/0028365 A1 | 10/2001 | Ludolph |
| 2003/0018714 A1 | 1/2003 | Mikhailov et al. |
| 2003/0160815 A1 | 8/2003 | Muschetto |
| 2004/0075691 A1 | 4/2004 | Moon |
| 2004/0155909 A1 | 8/2004 | Wagner |
| 2004/0216059 A1 | 10/2004 | Vong et al. |
| 2005/0024341 A1 | 2/2005 | Gillespie et al. |
| 2005/0120306 A1 | 6/2005 | Klassen et al. |
| 2005/0153745 A1 | 7/2005 | Smethers |
| 2005/0188320 A1 | 8/2005 | Booking |
| 2005/0213717 A1 | 9/2005 | O'Neil et al. |
| 2005/0282564 A1 | 12/2005 | Yoo |
| 2006/0031782 A1 | 2/2006 | Houmura et al. |
| 2006/0101350 A1 | 5/2006 | Scott |
| 2006/0101354 A1 | 5/2006 | Hashimoto et al. |
| 2006/0156256 A1 | 7/2006 | Lee |
| 2006/0174201 A1 | 8/2006 | Zaner-Godsey et al. |
| 2006/0253801 A1 | 11/2006 | Okaro et al. |
| 2006/0267783 A1 | 11/2006 | Smith |
| 2007/0011614 A1 | 1/2007 | Crow et al. |
| 2007/0106955 A1 | 5/2007 | Conrad et al. |
| 2007/0162871 A1 | 7/2007 | Ishii |
| 2007/0233377 A1 | 10/2007 | Salay et al. |
| 2008/0008239 A1 | 1/2008 | Song |
| 2008/0040693 A1 | 2/2008 | Toyama et al. |
| 2008/0051152 A1 | 2/2008 | Nam et al. |
| 2008/0104639 A1* | 5/2008 | Yoon ............... H04H 40/18 725/56 |
| 2008/0171535 A1 | 7/2008 | Carmody et al. |
| 2008/0207184 A1 | 8/2008 | Wassingbo et al. |
| 2008/0256472 A1 | 10/2008 | Kim et al. |
| 2008/0276170 A1 | 11/2008 | Bonansea et al. |
| 2008/0307305 A1 | 12/2008 | Klassen et al. |
| 2009/0006570 A1 | 1/2009 | Forstall et al. |
| 2009/0064055 A1 | 3/2009 | Chaudhri et al. |
| 2009/0069038 A1 | 3/2009 | Olague et al. |
| 2009/0222748 A1 | 9/2009 | Lejeune et al. |
| 2009/0265656 A1 | 10/2009 | Jetha et al. |
| 2009/0271731 A1 | 10/2009 | Lin et al. |
| 2009/0287783 A1 | 11/2009 | Beare et al. |
| 2010/0017872 A1 | 1/2010 | Goertz et al. |
| 2010/0058231 A1 | 3/2010 | Duarte et al. |
| 2010/0146384 A1 | 6/2010 | Peev et al. |
| 2010/0185950 A1 | 7/2010 | Lee |
| 2010/0185980 A1 | 7/2010 | Kuo |
| 2010/0214250 A1 | 8/2010 | Gillespie et al. |
| 2010/0228577 A1 | 9/2010 | Cunningham et al. |
| 2010/0235732 A1 | 9/2010 | Bergman |
| 2010/0285785 A1 | 11/2010 | Wang et al. |
| 2011/0028186 A1 | 2/2011 | Lee et al. |
| 2011/0072373 A1 | 3/2011 | Yuki |
| 2011/0102357 A1 | 5/2011 | Kajitani |
| 2011/0202656 A1 | 8/2011 | Gentile et al. |
| 2014/0365122 A1 | 12/2014 | McGavran et al. |

FOREIGN PATENT DOCUMENTS

| | | |
|---|---|---|
| JP | H05210477 A | 8/1993 |
| JP | 2002-55750 A | 2/2002 |
| JP | 2003-169372 A | 6/2003 |
| JP | 2003195998 A | 7/2003 |
| JP | 2004-007144 A | 1/2004 |
| JP | 2006-302263 A | 11/2006 |
| KR | 10-2005-0018145 A | 2/2005 |

OTHER PUBLICATIONS

Extended Search Report from counterpart European Application No. 18194365.5, dated Apr. 1, 2019, 7 pp.

Response to extended Search Report dated Apr. 1, 2019, from counterpart European Application No. 18194365.5, filed Jun. 26, 2019, 8 pp.

Response to first Examination Report dated Mar. 19, 2018, from counterpart Indian Application No. 1660/MUMNP/2010, filed Aug. 23, 2018, 59 pp.

"Foma N904i" [online], 2007, pp. 23-31 URL: http://www.nttdocomo.co.jp/support/trouble/manual/download/n904i/index.html 11 pages (English abstract included).

Apple, Newton 2.0 User Interface Guidlines, Addison-Wesley Publishing Co, 1996, pp. 1-307.

Australian Office Action in Australian Application No. 2009209018, dated Jan. 9, 2013, 3 pages.

Chinese Office Action in Chinese Application No. 200980110778.5, dated Dec. 4, 2012.

Communication pursuant to Article 94(3) from the European Property Office from counterpart EP Application No. 09705490.2, dated Jan. 3, 2018, 5 pp.

Decision on Appeal issued in Japanese Application No. 2010-545217 on May 25, 2015, 21 pages (with English translation).

European Search Report in European Application No. 09705490.2, dated Oct. 29, 2014, 3 pages.

Examination report under sections 12 & 13 from Indian Patent Office from counterpart IN Application No. 1660/MUMNP/2010, dated Mar. 19, 2018, 5 pp.

International Preliminary Report on Patentability for Application No. PCT/KR2009/032687, dated Aug. 12, 2010, 6 pages.

International Search Report & Written Opinion for Application No. PCT/US2009/032687, dated Sep. 9, 2009, 11 pages.

(56) References Cited

OTHER PUBLICATIONS

Notice of Intent to Grant from counterpart European Application No. 09705490.2, dated May 22, 2018, 7 pp.
Office Action issued in European Application No. 09705490.2 dated Nov. 12, 2014, 6 pages.
Response to Examination Report dated Jan. 3, 2018, from counterpart European Application No. 09705490.2, filed Apr. 13, 2018, 9 pp.
Southern Oregon University. "Windows XP—File Management", Sep. 21, 2006 [Retrieved on Jun. 5, 2008]. Retrieved from the Internet URL:http://www.sou.edu/it/howtodocs/winxn/xnwinexnlorer.shtml?print_version 6 pages.
University of Wyoming. "Microsoft Outlook E-Mail Notification" Jul. 2005 [Retrieved on Jun. 5, 2008]. Retrieved from the Internet URL:http://uwadmnweb.uwvo.edu/cessupport/Microsoft/Outlook/email_notification_asp 4 pages.
Prosecution History from U.S. Appl. No. 12/363,325, dated Aug. 5, 2011 through Jul. 31, 2015, 119 pp.
Prosecution History from U.S. Appl. No. 13/349,371, dated Mar. 12, 2012 through Jul. 13, 2015, 110 pp.
Prosecution History from U.S. Appl. No. 14/942,066, dated Sep. 22, 2017 through Mar. 15, 2018, 24 pp.
Office Action from counterpart European Application No. 18194365.5, dated Apr. 8, 2020, 4 pp.
Response to Examination Report dated Apr. 8, 2020, from counterpart European Application No. 18194365.5, filed Jul. 21, 2020, 22 pp.

\* cited by examiner

NOTIFICATION OF MOBILE DEVICE EVENTS

CROSS-REFERENCE TO RELATED APPLICATIONS

This application is a continuation of U.S. application Ser. No. 14/942,066, filed Nov. 16, 2015, which is a continuation of U.S. application Ser. No. 13/349,371, filed Jan. 12, 2012 (now Issued as U.S. Pat. No. 9,191,486), which is a continuation of U.S. application Ser. No. 12/363,325, filed Jan. 30, 2009 (now Issued as U.S. Pat. No. 9,154,606), which claims the benefit of U.S. Application No. 61/024,869, filed Jan. 30, 2008, the entire contents of which are hereby incorporated by reference.

TECHNICAL FIELD

This document relates to systems and techniques for presenting events to a user of a mobile device, such as a smartphone.

BACKGROUND

More and more, people are on the run, using mobile communication devices to keep communicating. From mobile devices, people make and receive telephone calls, send and receive electronic mail, surf the web, and text with various friends and acquaintances.

When messages come in or when other events occur on a mobile device, it is customary for the device to make a noise signaling the event. Such an action derives from traditional telephones, which rang and still ring a bell when someone is calling. Such ringtones can now be customized depending on the identity of the caller for the incoming call. Also, a device may be switched to vibrate mode when silence is golden, such as at a meeting, a movie, or a play. For other sorts of incoming messages, such as e-mails, or for other events, the device may beep, vibrate, or provide some other form of alert.

SUMMARY

This document describes systems and techniques that may be used to alert a user of a mobile device about an event, such as about the presence of a recently-received message, e.g., an e-mail, voice mail, or text message, or other form of event such as a change in song on a music player running in a background state. In general, when a message is first received (or another event is triggered), a portion of the message may be provided in an area that is outside the main area of a mobile device display, such as by scrolling information about the message through a traditional status bar area of the device. A status bar area is the typically-static area on a device that displays information such as bars for wireless signal strength, a remaining battery life indicator, an icon that shows the network over which wireless communication is occurring, and the like. The main area or zone of the display is generally the central, largest area of a display where active programs are displayed, while supplemental elements are typically displayed around the periphery of the main area or over the main area in pop up windows or similar graphical elements.

Where the event that is being noticed is a message, the scrolling notification for the message may include, for example, an identifier for the sender of the message and a snippet from the message, such as the first few words in an e-mail or a subject line from an e-mail. The alert may also include an icon showing the type of message, such as an envelope for an e-mail message. Where the alert is not a message, the scrolling notification may include other descriptive or suggestive text or graphics, such as the title of a song, the status of a device parameter that is being reported, the identity of an item (e.g., a physical good or a computer application) that currently became available at an on-line marketplace, and other such information.

The user may press a selection button, or may press on the area where the notification is being displayed, during the display of the alert, to bring up the full message. After the notification has scrolled across the status bar, an icon may be added to an area in the status bar, such as at an unused end of the status bar. When other types of messages or alerts are received, their corresponding icons may also be displayed in the status bar. Certain alerts may simply be displayed temporarily, and may not have a persistent indicator generated to indicate that the alert occurred; for example, the changing of songs on a media player running in the background may simply be scrolled once or twice across a status bar and then never appear again. In this manner, a user may readily see, by looking at the device display, the forms of messages that they have received and whether they have received any messages at all of a particular type so that they can readily determine whether to review messages, or instead to go about their day.

Although indicators for certain messages may be maintained in the status bar, as mentioned above, other messages may be more transient. For example, a message indicating that a music player has moved to a new song may scroll across a status bar and then disappear. If a user touches the status bar while the message is being displayed, the selected area may expand so that all the song in a currently playing album or playlist are displayed. If the user makes no such selection, the presence of the sing title will be forgotten after the scrolling of the title is complete. In this manner, the reaction of the device to selections in the notification area (e.g., in a status bar of a smartphone display).

In one implementation, a computer-implemented user notification method is described. The method comprises displaying, in a status area near a perimeter of a graphical interface, a notification of a recent alert event for a mobile device, receiving a user selection in the status area, and in response to the receipt of the user selection, displaying, in a central zone of the graphical interface, detail regarding a plurality of recent messaging events for the mobile device. The notification can be displayed in place of battery and signal elements in a status bar of the graphical interface, and the notification can comprise text that scrolls across the status bar. In addition, the method can further comprise removing the text from the status bar after scrolling the text and displaying in the status bar an icon that visually represents an application corresponding to the messaging event.

In some aspects, the method further comprises aggregating, in the status bar, a plurality of icons that are each visually representative of one or more recently received messaging events. The text can include textual content from the alert event. Also, the alert event can correspond to a communication from a remote server reporting a message from the group of computer applications consisting of electronic mail, chat, text messaging, voice mail, and a posting of data to a shared networked data source. In certain aspects, the user selection comprises a long press on a display screen or a pointing device, and the display in the central zone comprises a reduced-size version of a display of an active application that was in the central area before the user selection.

In yet other aspects, the display in the central zone comprises a list of messages from a plurality of messaging applications, and the method can also comprise displaying a user-manipulable slider mechanism in response to the user selection. In addition, the method may include receiving a dragging manipulation of the slider mechanism across the graphical interface, moving the slider mechanism in response to the dragging mechanism, and displaying the detail regarding the plurality of recent messaging events behind the slider mechanism as it is slid across the display.

In another implementation, a machine-readable data storage medium is disclosed. The medium has instructions stored on it that, when executed, cause one or more processors to display, in a status area near a perimeter of a graphical interface, a notification of a recent alert event for a mobile device, receive a user selection in the status area, and in response to the receipt of the user selection, display, in a central zone of the graphical interface, detail regarding a plurality of recent messaging events for the mobile device. The notification can comprise text describing the recent alert event and is displayed in place of battery and signal elements in a status bar of the graphical interface. Also, the instructions can further cause the one or more processors to aggregate, in the status bar, a plurality of icons that are each visually representative of one or more recently received messaging events.

In certain aspects, the display in the central zone comprises a list of messages from a plurality of messaging applications. Also, the instructions can further comprise instructions to cause the one or more processors to receive a dragging manipulation on a touch screen display of the graphical interface, from the status area and across the display, and move the slider mechanism in response to the dragging mechanism, and display the detail regarding the plurality of recent messaging events behind the slider mechanism as it is slid across the display.

In yet another implementation, a computer-implemented notification system is disclosed. The system comprises a wireless interface to receive data for a user of a mobile device, a notification manager to generate a notification message for a device event, including device events received through the wireless interface, where the notification message includes information that describes the device event, and a display manager to generate elements for a graphical display, to receive the notification message and to present the notification message in a first zone near a perimeter of the graphical display. The system can further comprise an input device to receive a user selection in the first zone, wherein in response to the user selection, the display manager displays, in a central zone of the graphical interface, detail information regarding a plurality of recent messaging events for the mobile device. Also, the display manager can display the notification message as text that scrolls in a status bar area of the graphical display. Also, the display manager can be adapted to remove the text from the status bar and display in the status bar an icon that visually represents an application corresponding to the messaging event.

In another implementation, a computer-implemented notification system is disclosed that comprises a wireless interface to receive data that includes messages for a user of a mobile device, a notification manager to generate a notification message for a received message that includes information that describes the message, and means for generating a display of information corresponding to the notification message on a graphical display. The system can further comprise means for generating, in response to a user selection, a display of detail information regarding a plurality of recent messaging events for the mobile device.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for providing a user of a mobile device with notifications about messaging events and other similar events for the device. Such messaging events may include missed calls, voice mails, emails, file transfers, file uploads, and other such events. The notifications may occur in such a manner so as to not disrupt a user from other actions they are performing on the device, such as talking on a telephone call or playing a music or video file. In general, the notifications may occur by having a notification message—which may be an abbreviated form of the actual communication, e.g., a name and subject line for an incoming e-mail—be displayed in a peripheral area at the edge of a display, such as a status area, or status bar, for the mobile device. The status bar is the area in which status indicators such as battery charge level and signal strength level are traditionally displayed—typically at the top of a display. For example, a portion of the message may be scrolled across the top of the display in a ticker tape manner.

After the message portion has scrolled across the status area, an icon may be placed in the status area, to indicate to a user that a message has been received since the last time the user checked messages. The status area may then also become selectable by the user, so that selection of the status area causes the display of accrued messages to occur. Such selection of the status area may occur by long press on the status area, or by pressing on the status area and dragging downward to pull out the messages as if they are mounted on or under a window shade. Where the device has a fairly flush front surface, the action may take the form of a finger swipe across the face of the display, where the edge of the element showing an extended view of the messaging events "sticks" to the user's finger as the finger moves past.

In addition, where the messages (or other such events) are large in number and do not all fit on the display at one time, the presence of additional off-screen messages may be indicated by a fading out of the last message toward the edge of the display (e.g., a fade-to-black where the background is black). Such fading may create the visual impression that the last message is curving back away from the user and into the device, as if the messages were printed on a sheet of paper that was bending backward away from the user. The bottom of such a display element may also taper inward slightly at its edges (i.e., become narrower and smaller at its lower portion) to create the impression that it is moving away from the user.

Figure 1:
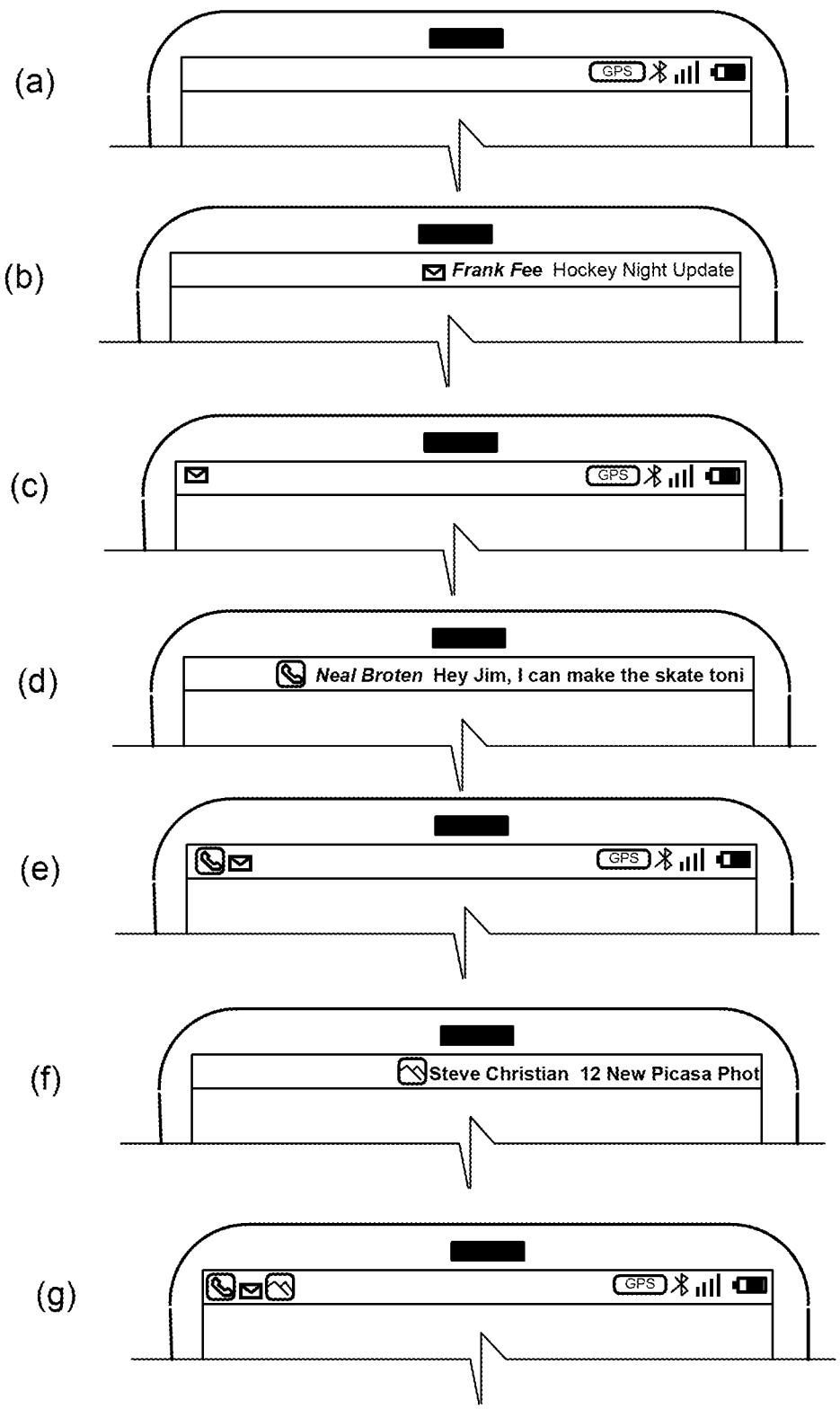
FIG. 1 shows portions of a mobile device demonstrating actions in a status bar.

Referring now to FIG. 1, there is shown portions of a mobile device display demonstrating actions in a status bar. In general, seven instances (labeled a through g) of the same display portion are shown in chronological order, to demonstrate an example of functionality that may be provided by a notification component on the device. The particular display portion shown here is the top of a graphical display, where a status bar is located.

Instance (a) shows a status bar of a mobile device in a normal state, with icons displayed to indicate that the device is currently using GPS and Bluetooth capabilities, and also showing the current signal strength and remaining battery power. At such a time, the user may be doing nothing with the device (e.g., so that the device's desktop and wallpaper are being displayed in the main display area below the status bar) or may be operating an application in a main display area of the device, i.e., the central larger portion of the display, of which only the very top portion is shown here.

Instance (b) shows what occurs when the device receives an e-mail—here a message from Frank Fee about a planned night of intramural hockey. To show such a new message to the user of the device, the static status indicators may be removed from the status bar temporarily, and the name of the sender and the subject of his message may be shown in their place, such as by rolling over them visually. For example, the name and subject may be scrolled from one side of the status bar to the other (e.g., from right to left in this example), or may be scrolled from top to bottom or displayed statically in the status bar. In addition, an audible prompt such as a beep or a shaking of the device may be provided when the message information begins to be displayed in the status bar, in a familiar manner.

Instance (c) shows the display some time after the e-mail message has arrived. When the message initially arrives, the text may be scrolled once through the status bar, scrolled multiple times, or frozen for a time after it reaches the end of the status bar. In this manner, the user may have an opportunity to review it without interrupting whatever is occurring in the main zone or area of the display. Eventually, however, the user will need the status indicators back, so that the notification text may be replaced with the status indicators. In addition, as shown, an icon for the messaging event—here, an envelope to indicate an e-mail—is placed in the status bar. In this manner, if the user was not looking at the device during the scrolling of the notification text, the user may still be alerted to the fact that a message has arrived since he or she last reviewed messages. Although not shown here, an indicator such as a small number may be provided with the icon to show how many messages of that type have been received.

At instance (d), another message has arrived at the device—this time a voice mail message from Neal Broten. In this example, the device is connected to a system that provides speech-to-text transcription, such as automatic transcription, and the first few words of Mr. Broten's message are shown in the status bar behind his name. The name may be determined, for example, from ANI signals or other similar caller ID signals received by the device or a server providing information to the device, and the name may be provided by the telephone network or by the user's device matching the incoming telephone number to a user address book.

Instance (e) shows an updated status bar, where an icon for the voice mail message has been added to the icon for the prior e-mail message. In this example, the icons are sorted according to priority of importance, where voice mails have been determined to be more important than e-mails, though the order may also represent the category having the most messages, the category have the first message, or the categeory having the most recent message, among other things.

Instance (f) shows yet another form of message arriving—this time a message reported from the PICASA photo sharing site where Mike E—apparently a friend of Neal Broten and Frank Fee—has posted new photos to share from their ice hockey league. This message, in this example, was sent from PICASA with an indicator that the photo posting was by Mike E. Again, the name of the person responsible for the message is shown, as is an icon (showing mountains that are representative of photography) and a text string describing the posting. And again, at instance (g), the icons for each of the three messages are shown along with the static status bar icons.

Whenever the notification icons (e.g., for e-mail, voice mail, or photo posts in this example) are displayed, a user may select them or may select more generally in the status bar to display more information about the messages represented by the notification icons, as discussed more fully with respect to the following figures. Such selection is discussed next.

Figure 2A:
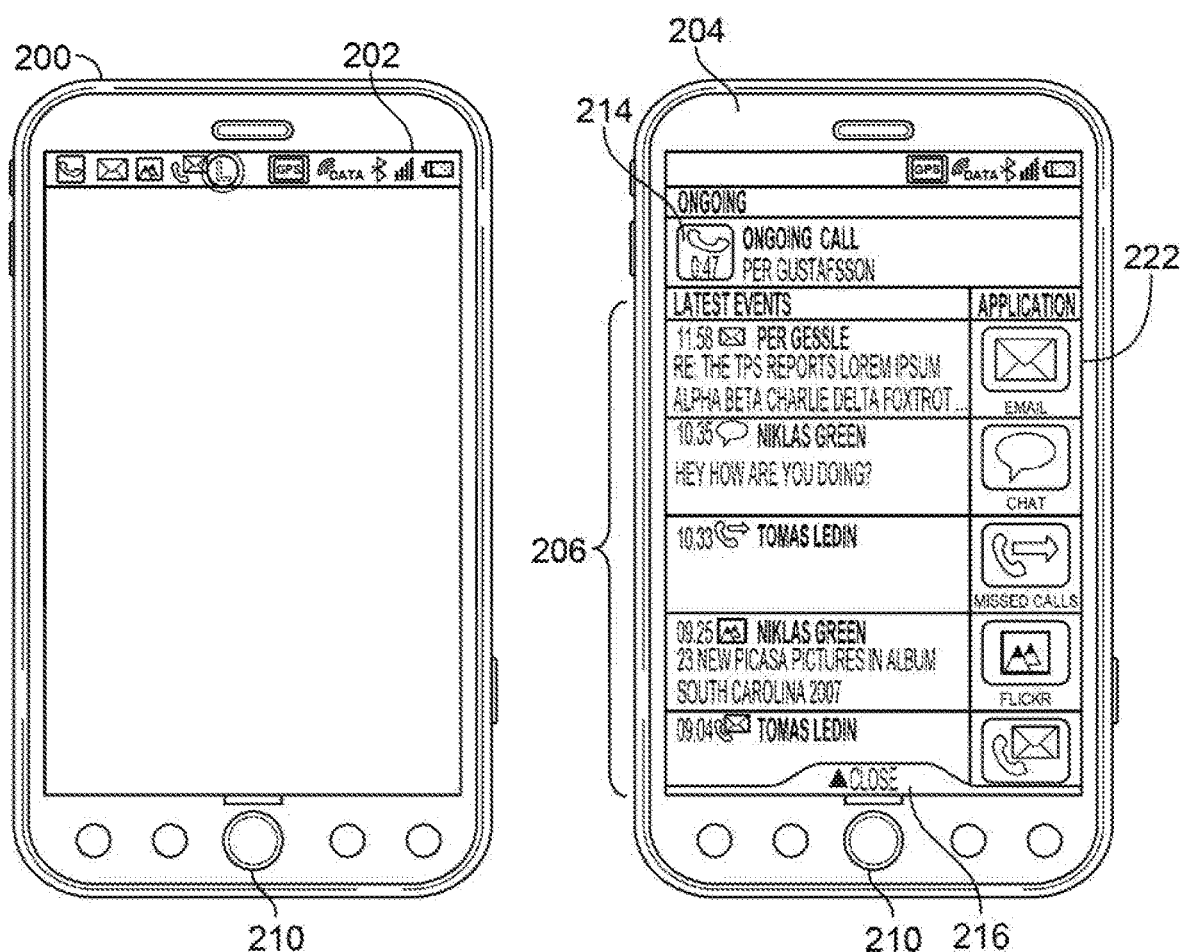
FIGS. 2A-2C show screen shots of mobile devices exhibiting notification functionality.
Figure 2B:
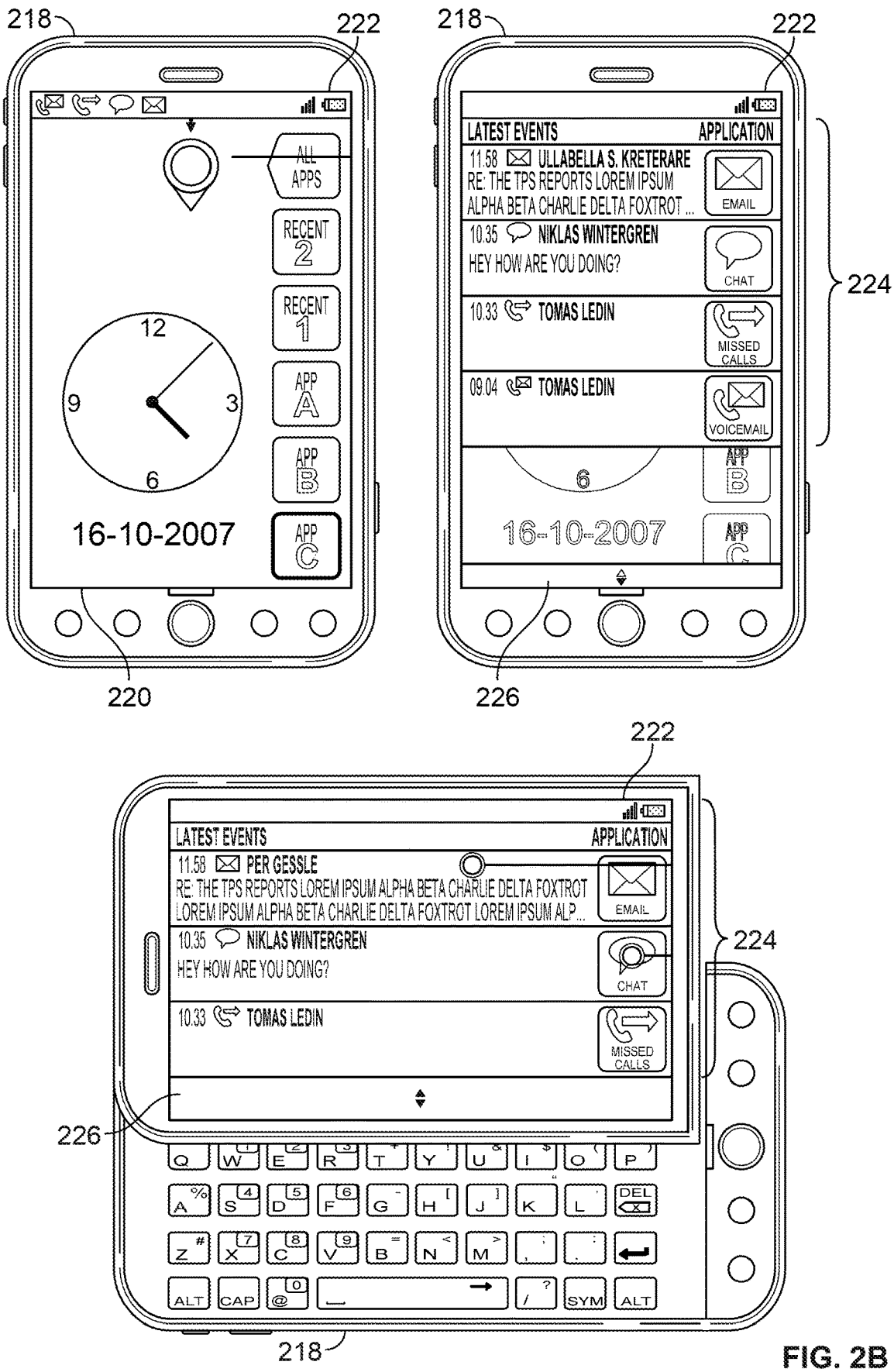
Figure 2C:
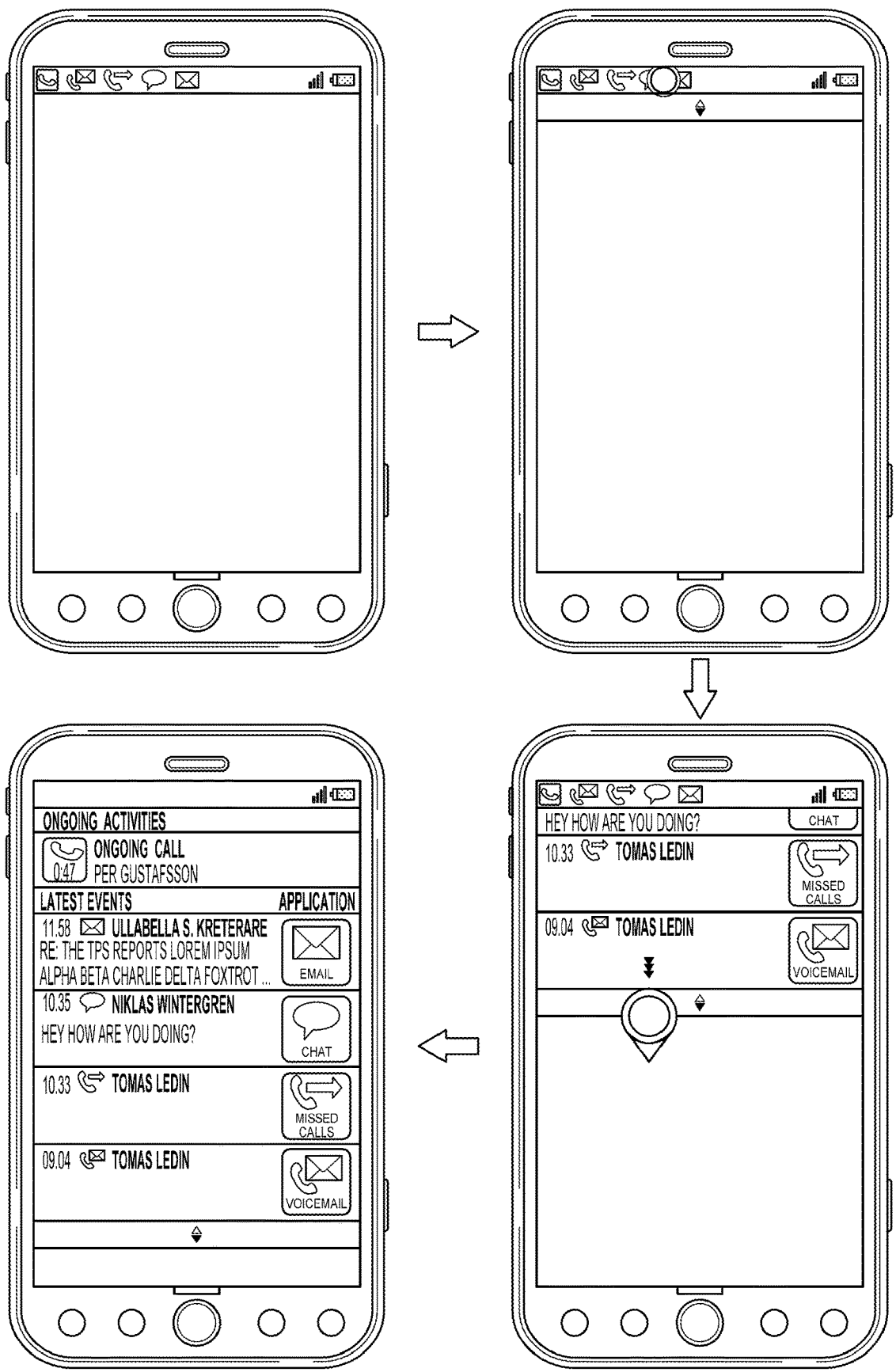

FIGS. 2A-2C show screen shots of mobile devices exhibiting notification functionality. Referring to FIG. 2A, there is shown two screens from a mobile device having a touch screen input on its display surface. The left screen generally shows the device after a number of messages have arrived. As shown to the left of the status bar 202 in the display 200, icons indicate messages related to voice mail, email, photo posts, and missed telephone calls. In addition, a circle with an "L" inside of it is shown schematically in this representation to indicate that a user is currently applying a long press (i.e., a selection that last more than a determined period that is greater than that for a simple short click—typically more than about 500 milliseconds, though it may be made adjustable by a user, such as the adjustability provided in operating systems for the time between double-click events) to the status bar.

The main zone of the left display is shown blank in this example simply to indicate that the current status of the zone may take a variety of forms. For example, a wallpaper background with various icons may be displayed with desktop icons—i.e., a mode for the device when the user is not focused on any particular application. Alternatively, one or more applications may be shown in the main zone, such as an application tracking an ongoing telephone call, and displaying an image of the person with whom the call is occurring, a number for that person, and an elapsed time for the call, among other things.

The right screen in FIG. 2A shows the display 200 after the user has long-pressed or dragged downward on the status bar 202. In this example, the main zone has been filed with the various messages that were left since the last time the user had reviewed his or her messages. The messages are shown in a message area 206 in the main zone of the display 204, while the status bar 202 is shown with the message notification icons removed (because the user has now been shown the messages and does not need a notification about them). In this example, the first message is an e-mail from Per Gesele, the second is a GOOGLE TALK message from Niklas Green, the third is a missed incoming call from Tomas Ledin, the fourth is a posting of PICASA photos by Niklas Green, and the fifth is a missed call from Tomas Ledin. As shown, the messages are organized here from top to bottom in reverse chronological order.

Messages may also be sorted by application. For example, a single line of the display may indicate the number of e-mail messages a user has received since they last launched or focused on their e-mail application, while a next line can do the same for text messages, downloads, and other such notification events. Selection by a user on any one of the lines may cause the corresponding application to be launched or made the focus on the device, with the messages received since the user last employed the application listed in the most prominent location in the application.

The messages near the bottom of the message area 206 fade to black in order to provide a visual impression that they are curving back into the dark inside portion of the device. In this manner, the display 204 provides the user with a visual indication that there are additional messages off the bottom of the list. The user may employ a trackball 210 or may slide their finger upward across the display to scroll down and see the additional messages. After such scrolling downward, the message that is at the top of message area 206 will fade to black to indicate that there are more messages above the message area 206 and that the user can thus scroll back in that direction.

A group of application icons 212 are shown to the right side of the main zone of the display 204. A user selection of one of the messages in the message area 206 will bring up the application opened to that message, while the selection of one of the application icons 212 will bring up the particular selected application with its various messages displayed, e.g., in reverse chronological order.

An active application area 214 is shown above the message area 206. The active application area 214 shows a reduced-area view of an application that was running, or active, in the main zone when the user selected to expand the messaging information. In this example, the application is a telephone call that the user was conducting when they chose to look at their other outstanding messages. Before the user selected to see more about the messages, the application may have occupied all of the main zone, and may have included an extensive amount of information, such as an image of the person with whom the call was occurring. To make room for the messages, the application area 214 has been shrunk visually here to take up only about twenty percent of the display 204, and now shows only an elapsed time for the call in a telephone icon, a status of the call, and a name of the caller or callee.

A tab 216 is shown visually at the bottom of the display 204. In this example, the tab is a thin bar extending fully across the bottom of the display 204, with a thickened area in its middle that is labeled with an instruction of "close" for the user. Such an instruction indicates to the user that selecting the tab 216 (e.g., by pressing on it) will cause the message area 206 to disappear, so that the application area 214 will expand back to its original space. As described below, the tab 216 may take other forms, and may be dragged upward by a user in a manner like a window shade, to fully or partially close the message area 206. The user may also close the notifications area by dragging upward across it.

The application area 214 may also accommodate multiple applications where the operating system is capable of multitasking. In such a situation, each application in the application area 214 may be slightly smaller than that shown in the figure and/or the total application area 214 may be larger and the message area 206 may be correspondingly smaller, so that the applications are stacked above or next to each other. Also, a user may be given the ability to scroll up and down between applications so that the applications will fit better. Alternatively, each application that is running may be shown as an icon, where the multiple icons are spaced and spread horizontally across the application area 214, and a user may see more detail about a particular application by selecting its corresponding icon. Upon such a user selection, the selected application may push the other operating applications out of the way.

The message area 206 may also display other information when a user makes a selection in the status bar 202, including information that depends on the current context of the device. For example, a notification area like that shown in FIG. 2A may be displayed when an e-mail message is scrolling across the status bar 202 or when no alert information for a recent alert is being moved through the status bar 202. However, when the user's selection in the status bat coincides with the presence of other types of alert information in the status bar, the functionality provided in the main area of the display may be dependent on the type of alert that is currently occurring. For example, if a user is listening to music on the device, a song title may scroll across the status bar for several seconds each time a new song starts. If the user selects the status bar 202 during that time, the device can infer that interaction with the music player is desired by the user. As a result, music player controls (e.g., play, pause, stop, next track, last track, etc.) may be displayed along with album art and perhaps a list of songs on the album or next songs in a playlist. The user can then manipulate such controls to change the music that is playing, such as by jumping forward one or more songs in the playlist. The user may then drag the area back up under the task bar 202, and may subsequently pull down from the status bar 202 to produce a main display area that shows messaging information again (like in FIG. 2A) rather than music player information.

Also, notifications may be provided from an on-line applications store for the device. For example, a user may download an application, and the notification techniques described here may be used to inform the user that a new version of the application is available. If the user selects the status bar while such a notification is being displayed, the device may show a display for a download application for the applications store. The notification may also be indicated along with other messages, and the user may select the notification in preference to notifications for other services in order to have the download application launch so that the user can choose to obtain the new update.

The display may also show a control, such as a selectable graphic button, that a user may select to clear all notifications. Such an action will cause the main area of the display to go blank, and the icons for each message type in the status bar to disappear.

FIG. 2B shows another example of displays that may be generated to alert a user of a mobile device of messaging or other events. The displays are shown in three different images of the same mobile device, at different points in time. In the first instance, at the left, the device 218 is shown displaying a clock application on display 220, such as in an operating system desktop display mode. In addition, a number of application icons are arranged down a side of the main zone of the display 220. Those icons, in this example, represent a top icon that, when selected, causes icons for all applications on the device to be shown on the display 220 (e.g., by pushing the clock application out of the way or by appearing over the top of the clock application, or pushing the clock application downward into a smaller zone such as by changing the clock from an analog clock to a smaller digital clock). The two icons below that are icons for the last two applications used or launched on the device 218. And the remaining three icons are for applications that have been expressly selected to be on the main display 220 by the user, are applications that are most popular on the device (e.g., they have been launched the most times in the past X days), or otherwise qualify to be displayed in such a location.

A status bar 222 is also shown across the top of the display 220. The status bar 222 in this example is like those status areas discussed above, and includes four different messaging icons, showing that, since the user has last checked or cleared messages, the device has received one or more voice mail messages, one or more missed calls, one or more text messages or chat messages, and one or more e-mail messages.

The first display in FIG. 2B also shows a large circle surrounded by a ring having a downward pointing arrow. This element indicates a press by a user on the device 218 over the status bar 222, with a subsequent dragging downward of the status bar 222. (The element does not appear on the display.) Such action may be programmed to result in the expanding of a message area 224 into the main zone of the display 220. As with the message area 206 discussed above, the message area 224 may show the various messages that the user's device has received in the user's absence. And again, details about a message are shown to the left, while an icon for the particular messaging application is shown on the right. Also, selection of a particular message may result in the full message being opened for the user in its corresponding application, while selection of an application icon may cause the application to be invoked, with its associated messages or other features arranged in a standard manner (e.g., reverse chronological order).

In this example, there are four total messages and all of the messages fit on the display 220, so there is no need to blend the bottom message into the display background in portrait mode. Also, the message area 224 has a semitransparent background so that the active clock application can be viewed behind it. Where the application requires continued user activity (e.g., as indicated by a variable set by the user or by an author of the application), the application can be displayed in a shrunken window like that shown in FIG. 2A, such as at the top of the message area 224 or the bottom of the message area 224. For example, as the user pulls the status bar 222 downward, the pulling by the user may push down on the top edge of the application area, causing it to shrink until it reaches a minimum height like that shown in FIG. 2A, but with the application area located at the bottom of the display.

The third image, on the right, shows the device 218 as a slider smartphone having its slider portion slid open to uncover a keyboard. The sliding action or another action has caused the device 218 to change its display 220 to a landscape format from a portrait format. As such, the display 220 cannot show all four of the messages, so that the third message is shown blending into the black background.

The user may return the device 218, as shown in the right two figures, back into the device 218 shown in the left figure (but with the messaging icons in the status bar removed) by dragging the bar 226 at the bottom of the display 220 upward, or in some embodiments, by selecting the bar 226. As shown in the prior figure, the bar 226 may alternatively be displayed as a tab to more readily communicate to the user the concept of a pull-shade functionality for the display element.

FIG. 2C shows four displays on a device 230 exhibiting similar functionality to that just described. The leftmost display shows the collection of five different notification icons in a status bar of the display. The main zone of the display is shown blank to indicate that a variety of elements may be shown there at this point, such as device-resident applications, gadgets, icons for launching applications, and other such elements.

The second display shows, by a circle having a ring around it in the status bar, a selection by a user, such as by moving a pointer to the status bar and pressing a selection mechanism such as a trackball, or by directly pressing on the display with a fingertip on top of the status bar. Upon the user selecting the status bar, the bar may expand slightly, and a "slide down" indicator may be displayed, in the form of a notification bar with up and down arrows. The indicator may visually signal the user that they can pull the indicator down to show messages associated with the notification icons. Alternatively, a tab like that shown in FIG. 2A may be displayed below the status area.

The third display shows the user dragging the notification bar downward across the main part of the display, like a roll shade. At the point shown, more messages remain above the top of the display area, so that the top-displayed message is faded to black at its upper edge to indicate to the user that more messages are left to review. The initially shown message at the bottom of the pulled down section may be a message computed to be at the bottom of the message area once the bar is pulled all the way down to the bottom of the display. In this manner, the messages shown may be "attached" to the notification bar and may move down with it. Alternatively, the messages may be unattached to the bar, so that sliding the bar down appears to open a window into the area where the messages sit. In such an implementation, the top message would appear first at the top of the display, and more messages would gradually appear as the user pulls the bar downward—opening the metaphorical sliding window or cover on them (but with the bottom edge of the messages faded to black all the way down). In this manner, for example, if a gadget were running near the bottom of the display, the user could pull the bar down only so far, so as to not cover the gadget.

Certain momentum effects may be provided for the interaction with the notification bar. For example, if the user releases the notification bar in the upper portion of the display, the messages may spring back upward into the status bar and disappear, much like a roll shade that has not yet caught in its first position would spring back. Alternatively, if a user drags the bar quickly and releases it, the bar may continue moving until its momentum runs out or until it hits the bottom of the display. Also, in some implementations, if the user pulls the bar below a determined level on the display, the bar may automatically keep moving until it reaches the bottom of the display, or until it reaches a graphical element that it is not allowed to pass over.

The fourth display shows an example in which the user has pulled the notification bar all the way to the bottom of the display. In this example, four messaging events are displayed and an ongoing telephone application is displayed in a reduced area, in a manner similar to that discussed for the figures above. The notification icons in the status bar have now disappeared (e.g., by fading them out once a substantial portion of the messages has been displayed or when the bar touches the bottom of the display). The notification bar at the bottom of the display may then be selected by the user and slide upward to remove the messages from the display, and its motion may be managed in the same manner as its motion downward, but perhaps with more of a spring force pulling it back upward.

Figure 2D:
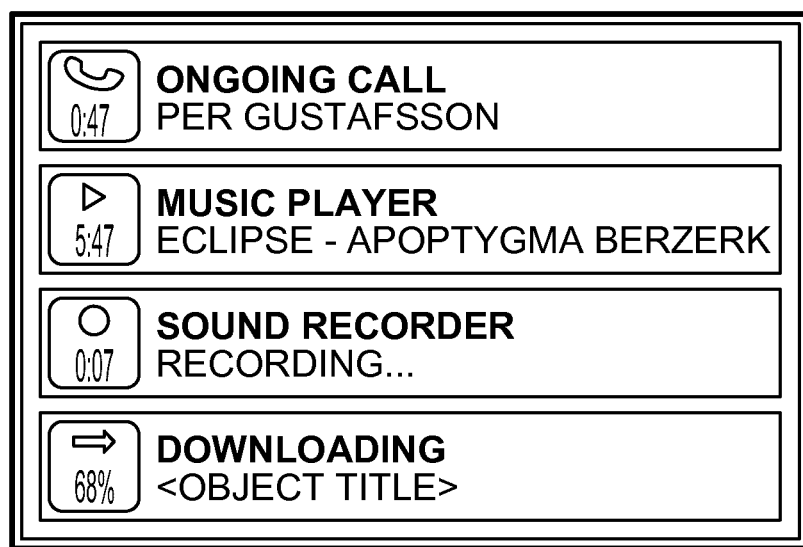
FIG. 2D shows examples of reduced-size application indicators.

FIG. 2D shows examples of reduced-size application indicators. In generally, the indicators show what may be displayed to represent an ongoing application when a user pulls a list of messages down over the running application on a display. In general, the applications shown by the indicators are potentially long-running applications that can continue to run when a user is looking at their various messages, and the applications thus include telephone calls, playing of music or videos, recording with a device, and downloading files from a central network. For each of the example applications, an elapsed amount indicator is shown, either as an amount of elapsed time or as an amount of an elapsed percentage of a transferred file.

In certain implementations, the top three applications shown here may be generally mutually exclusive because they are each audio functions, and it is very hard for a user to process such functions in parallel. In particular, a telephone call will generally take precedence over the playing of music or the recording of sound, so that when a call is picked up, the other sound-based applications are paused and moved to the background. As noted above, the various reduced-sized applications may be shown simultaneously when a user is reviewing messages, may be shown only as icons, may be shown as an even further reduced size, or may be displayed in other appropriate manners.

Figure 3:
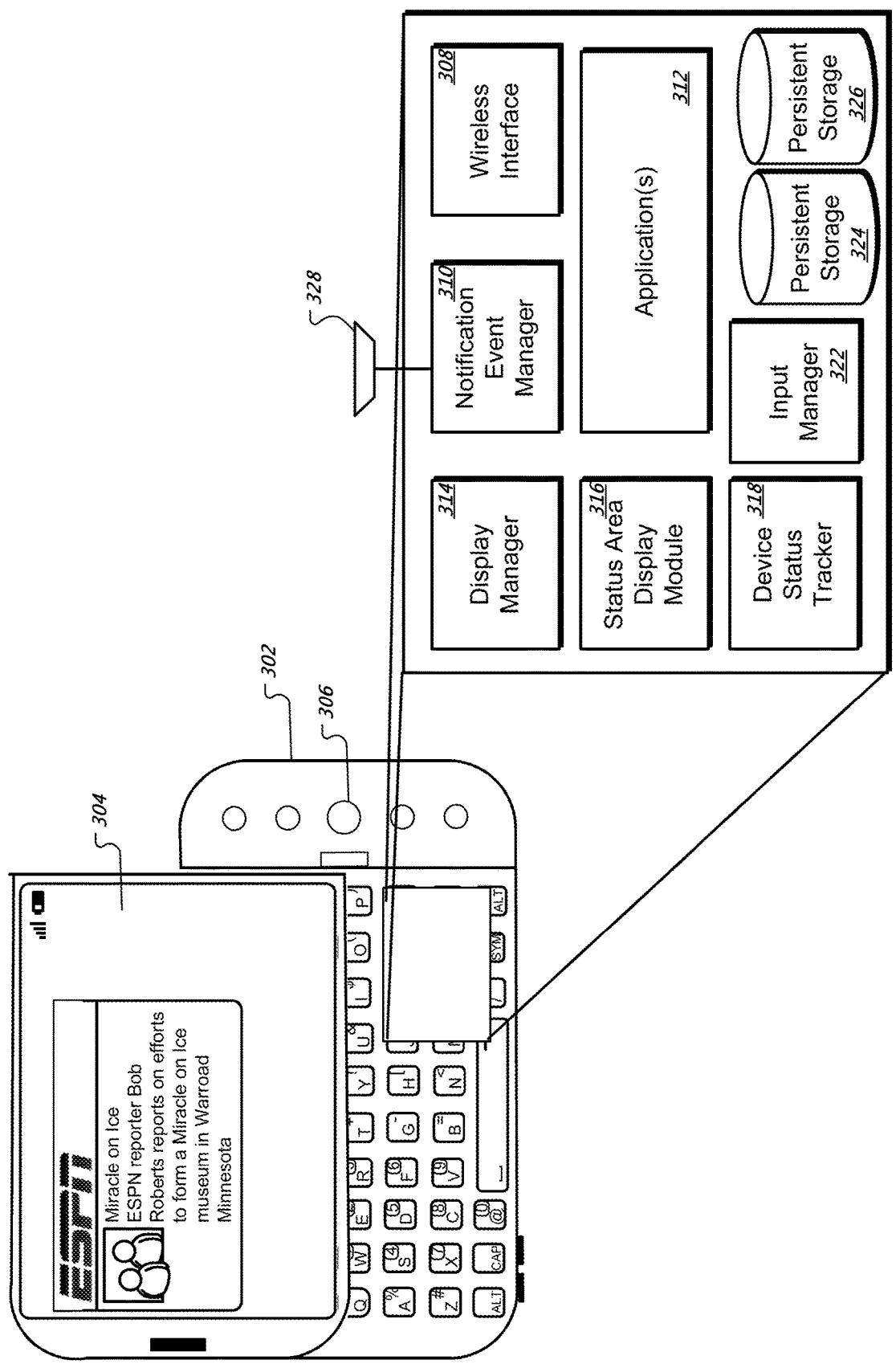
FIG. 3 is a schematic diagram of a system for providing notifications on a mobile device.

FIG. 3 is a schematic diagram of a system 300 for providing notifications on a mobile device 302. In this example, the mobile device 302 is a slider-based smartphone having a touch-screen 304 for input and output and a trackball 306 as an alternative input mechanism, but the device 302 may take a variety of forms.

A number of components are shown schematically inside the device 302 to indicate components in the device associated with messaging notification functionality for the device 302. One or more of the components may be implemented as part of a programmable microprocessor on the device 302, though the particular components are shown separately in this example for clarity of explanation. Other arrangements of components are also contemplated.

The device 302 includes a display manager 314 to control various elements to be shown to a user on the touch-screen 304, while an input manager 322 manages inputs received from the touch-screen or other mechanisms such as trackball 306. Various applications 312 may run on the device and may provide data for graphics to be displayed through the display manager 314.

A status area display module 316 may be responsible for generating the information to be displayed in the status area of the display on device 302, such as in a status bar along a top periphery of the display. For example, the status area display module 316 may gather information needed to generate graphical display elements representing a battery level of signal strength level for the device 302, in addition to icons that represent various feature that are activated on the device 302. Such information may be obtained, for example, from a device status tracker 318.

Various messages may be received over a network such as a wireless communications network connected to the internet, via a wireless interface 308. Information received from the network, such as from one or more remote servers, may be provided to the applications 312, and information may be passed from the applications 312 back to the network. Information may also be passed, after processing, to a notification event manager 310, which may manage notifications that are presented to a user, through touch screen 304 and/or speaker 328. For example, the notification event manager 310 may receive indications from various applications 312 about new events whose occurrence needs to be communicated to a user of the device 302. The notification event manager 310 may in turn provide information about the messages, such as the type of message, the name of the sender, and a subject line for the message, to status area display module 316, which may in turn pass information for displaying a notification like those discussed above, to display manager 314, which may have assigned a certain area of touch screen 304 for display of status indicators and notification information.

In addition, various forms of storage, including volatile storage 324 and persistent storage 326, may be provided on the device 302. The persistent storage 326 may store, for example, application programs and other information for operating applications on device 302. In turn, the volatile storage may store information about ongoing applications and also store information needed to generate various graphical displays on the touch screen 304.

Figure 4A:
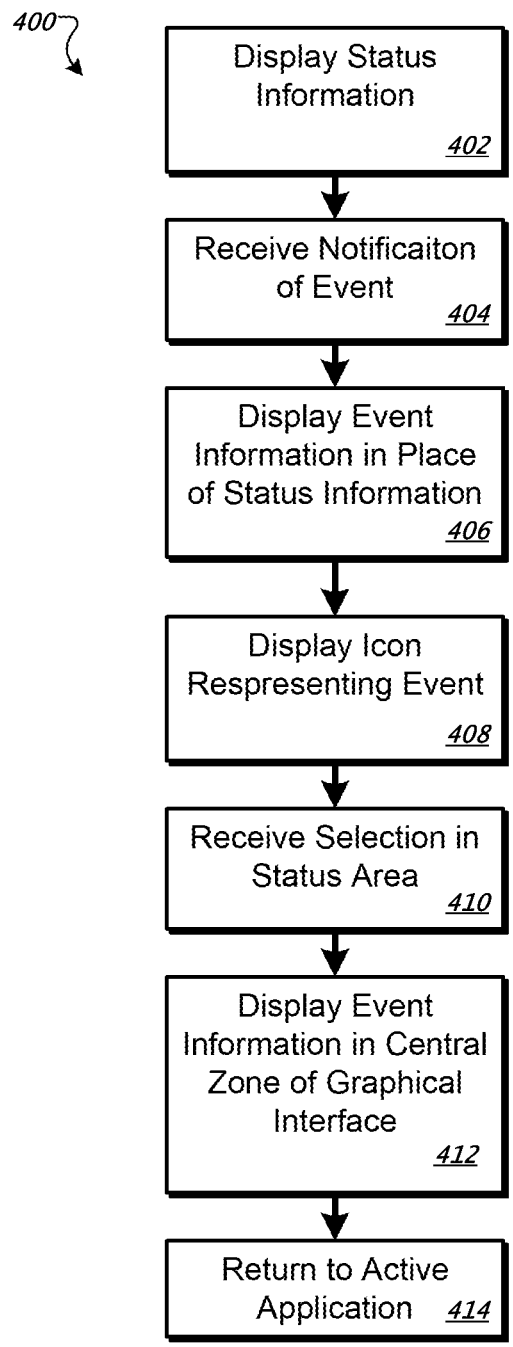
FIGS. 4A and 4B are flow charts of example processes for providing mobile device notifications.
Figure 4B:
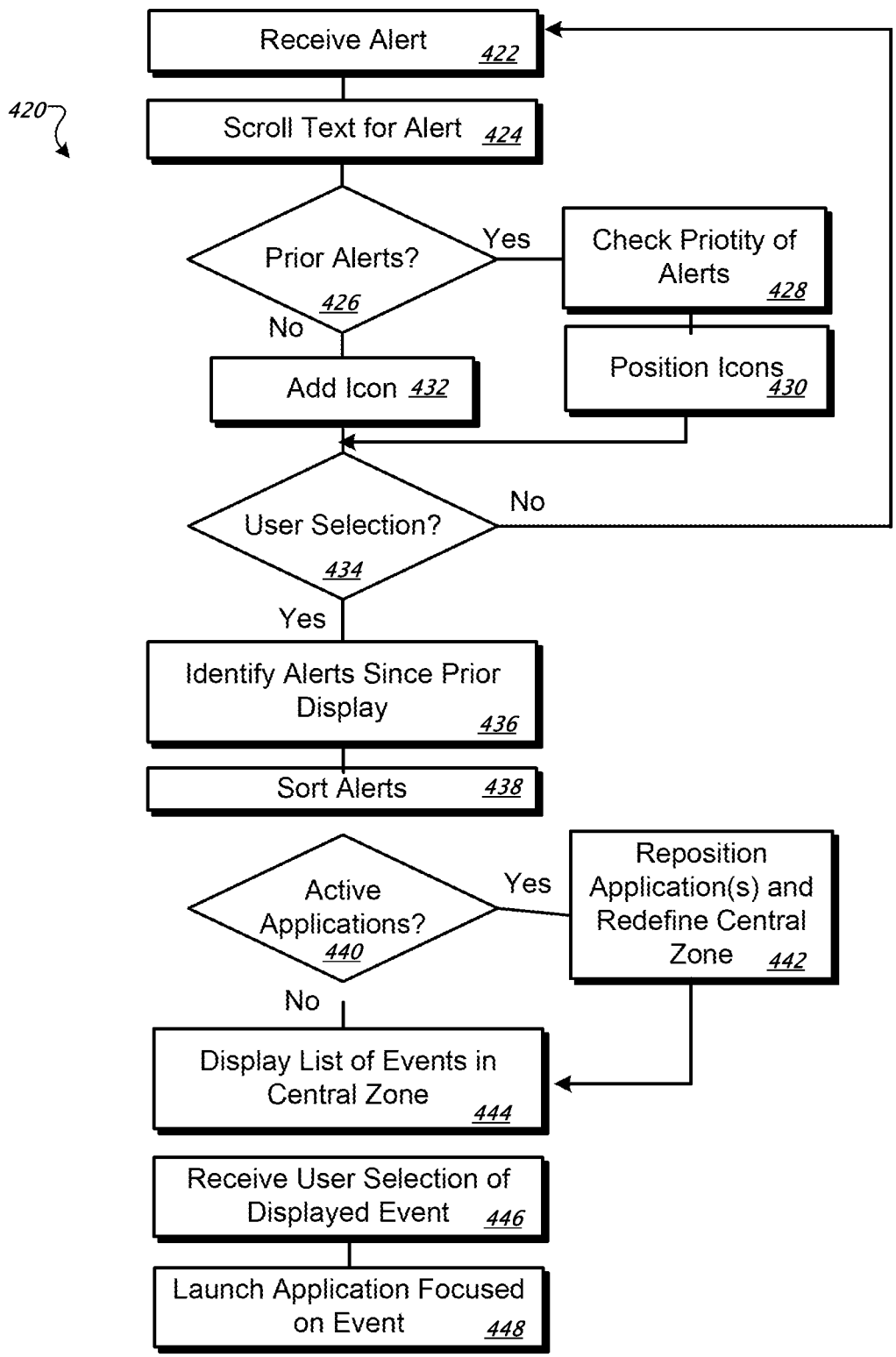

FIGS. 4A and 4B are flow charts of example processes for providing mobile device notifications. In general, FIG. 4A shows a process 400 by which notification events are received at a device and information indicative of the events is displayed in a status bar area of the device.

At box 402, status information is initially displayed on the device. Such status information may include, for example, information about battery life and wireless signal strength, among other things. In common implementations, status information is displayed in a status bar along a periphery of a display screen on a mobile device, such as along the top of a display screen.

The device receives a notification of an event at box 404. Such a notification may occur after an application has received a new message, such as by an e-mail client on the device receiving an e-mail from a server over a wireless network. The application may then, according to an agreed-upon API, pass limited information about the e-mail message to the system, such as the fact that the message is an e-mail, the name of the sender, and the subject of the e-mail. The device may then display the provided event information in place of status information in the status bar on the device, for example through the operation of an event manager in an operating system. For example, as shown in the figures above, the event information may be scrolled along a status bar of the device display. The application may be an application for the particular type of received message, such as an e-mail application that has the ability to place information in the status bar. Alternatively, the application may be a more general alert application the causes alerts to be displayed, without the need to have the underlying application active for the associated type of message.

At box 408, an icon representing the event is displayed. Such a display of an icon may occur when the message or other alert information has completed its display in a status bar. The icon may comprise a simple, small icon such as an envelope or other icon that can be displayed readily in the status bar. The icon may notify the user that the event has occurred, even after information for the event is no longer being displayed. Additional events, including events associated with other applications, may later be received, and additional icons may be displayed in the status bar for those events. Certain events may simply be scrolled across the display but not followed up with the display of an icon, where persistent notice of the events is not required. Such events may include changes in song titles in a music players, RSS feed headlines, and the like.

The device receives a user's selection of the status bar at box 410. Such a selection may include a selection like those described above, including by a user pressing on the status bar for a long press period, and/or the user pressing on the status bar and then dragging it downward across the top of the display. Alternatively, the user may select another element on the display, such as a menu element, to have the outstanding un-reviewed events displayed.

The device then displays event information for the various events that have been received since the user last checked such events, in the central zone of the graphical interface (box 412). Such events may be displayed, for example, in reverse chronological order from top to bottom. The events may also be group by event type—such as by one line in the display listing the number of e-mails that have been received since the last time notifications were cleared, another listing the number of text messages, another listing the number of updates for downloaded applications, and the like. The user may then handle each message as he or she sees fit, such as by reviewing it and then deleting or moving it. If the user would like to see more about a particular message, they may select that particular message and may be taken to the relevant application for that message, with the message open. The user may also select an icon to open the relevant application (or they may select a line that lists the number of messages of a certain type, when such a display is provided), and the message previously shown in the display will generally be the top message when the application opens.

The user may then interact as necessary with the various messages and/or applications. When the user is done handling the recently-received messages, the user may indicate an intent to remove the recent-received message elements from the display, such as by handling each of the messages or by selecting a graphical element to move the recent-received message elements up and off the display again so that the previously-operating application or applications may take their place again. The device and the user of the device may then continue on with their actions that did not depend on the recently-received messages. An selectable control, such as an icon, may also be provided so that a user may "clear" their alert events or messages. Such a control may be placed in the form of a bottom in the central display when a user drags down on a status bar, so that the user can re-set their notifications, and the icons in the status bar will be removed to indicate that there are no longer any messages to which the user needs to be directed.

FIG. 4B shows a process 420 that is similar to process 400 in FIG. 4A, but that includes additional detail for particular actions carried out by a mobile device that is receiving messages from a remote server system. The process 420 starts at box 422, where an alert is received. Such an alert may be generated by one or more modules in a system in response to the receipt of a message or messages (e.g., over a network such as in the form of e-mail messages, or within the device such as in the form of a message that a song playing on the device has changed), like the various messages described above. The process 420 may then cause text about the alert to be scrolled or otherwise displayed to a user of the device. Such text may include enough information to permit the user to understand the basic character of the message, so as to quickly seek to review the entire message if they are watching the device and if the message is immediately relevant to them.

If the user does not make a selection while the alert information is scrolling (which may lead to immediately opening the new message in its corresponding application), the process 420 may place an icon for the alert in the status area or status bar of the display. (For certain types of alerts, an icon may not be placed, such as those where the user may be interested in the information as it occurs, but would not be interested later.) To do so, the process 420 at box 426 determines whether there have been prior alerts since the user last looked at his or her messages, or since the user cleared prior alerts, so as to determine whether another icon is already located in the status bar. If there have been no prior alerts, then an icon for the current alert is added, perhaps with a number "1" near it to indicate that there is only one such message that has arrived during the period. The absence of a number may also be an indication that there was only one alert.

If there has been a prior alert, then the process 420 may check for the priorities of the respective alerts (box 428) to determine the order in which icons for the alerts should be displayed, and may then position the icons for display in the status bar (box 430). Where the same type of message (e.g., e-mail, voice mail, etc.) has been previously received, the display of the icons may stay the same, the order of the icons may stay the same but a numerical indicator on the appropriate icon may be incremented by the number of messages arriving during an alerting cycle, or the icons may also be reordered so that the message type having the largest number of messages may be displayed in a more prominent position (typically the outer edge of a horizontal bar, or the upper or lower ends of a vertical bar).

At box 434, the process 420 waits for a user selection, such as a user selection in the status bar area (though in certain implementations, the selection may occur in other manners). If there is no user selection before the next alerting event occurs, the process 420 then repeats the steps just described when a new message next arrives.

If there is a user selection, then the process 420 identifies the alerts or messages that have arrived since the prior display of messages (box 436) such as by checking a buffer of such information. The alerts or messages are then sorted, such as in reverse chronological order, for display (box 438).

Before displaying the alerts or messages, the process 420 determines whether any applications are active on the device that cannot simply be hidden under the messages on the display. Applications that can be hidden include various gadgets such as clocks and the like, while applications that cannot include the applications shown in FIG. 2D above. If there are active applications that cannot be hidden, those applications are repositioned and the central zone of the device, where the messages will appear, is redefined (box 442). For example, the running application may be provided in a smaller area around the edge of the central zone, while the messages may then be allowed to fill the remainder of the central zone.

If there are no such active applications, then a list of the messages or events that have arrived since the last such display are displayed in the central zone, such as in reverse chronological order (box 444). The system may then wait for input from the user, such as a user selection of a displayed event (box 446), and may then launch or make active the application that is associated with any selected event. For example, if the user selects an e-mail event, then the full e-mail may be displayed in an e-mail application so that the user may respond to the message, file it, forward it, or conduct the wide variety of other actions permitted by a typical email program. The particular displays that provide such display of events or messages, and permit user interaction with them, may include displays like those shown in the various figures above. Other interaction with the various displayed messages or events may also be accomplished in a similar manner.

Figure 5:
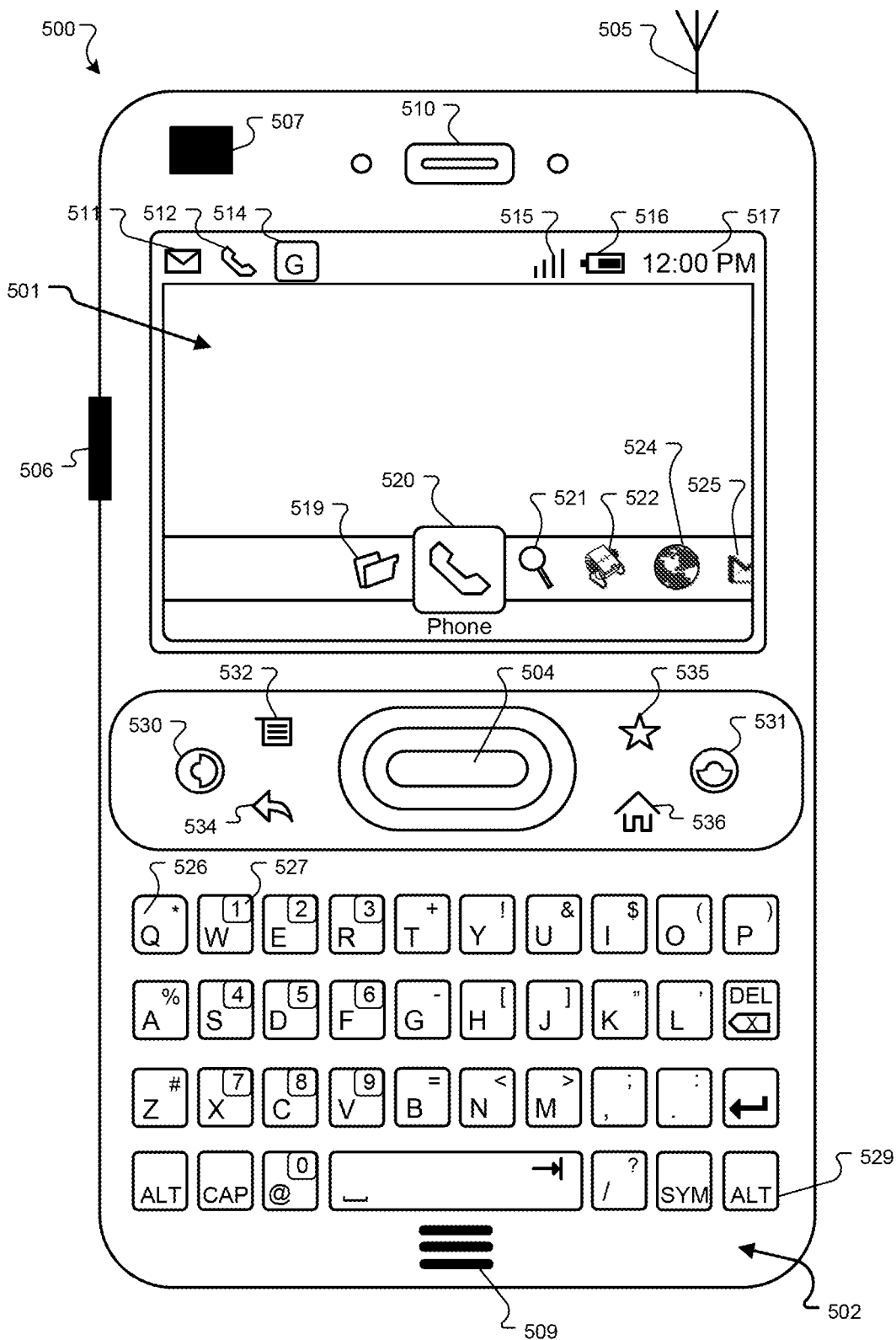
FIG. 5 is a schematic representation of an exemplary mobile device that implements embodiments of the notification techniques described herein.

Referring now to FIG. 5, the exterior appearance of an exemplary device 500 that implements the notification features described here is illustrated. Briefly, and among other things, the device 500 includes a processor configured to display notifications regarding events on the device 500, and to permit a user to conveniently "pull down" detail about the events relating to the notifications into an extended view of the events.

In more detail, the hardware environment of the device 500 includes a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera 507; a microphone 509; and a speaker 510. Although the device 500 shows an external antenna 505, the device 500 can include an internal antenna, which is not visible to the user.

The display 501 can display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna 505, such as by using signal strength bars; a battery life indicator 516 that indicates a measurement of the remaining battery life; or a clock 517 that outputs the current time.

The display 501 may also show application icons representing various applications available to the user, such as a web browser application icon 519, a phone application icon 520, a search application icon 521, a contacts application icon 522, a mapping application icon 524, an email application icon 525, or other application icons. In one example implementation, the display 501 is a quarter video graphics array (QVGA) thin film transistor (TFT) liquid crystal display (LCD), capable of 16-bit or better color.

A user uses the keyboard (or "keypad") 502 to enter commands and data to operate and control the operating system and applications that provide for responding to notification of alerts and responding to messages and the like (and also to a touch screen). The keyboard 502 includes standard keyboard buttons or keys associated with alphanumeric characters, such as keys 526 and 527 that are associated with the alphanumeric characters "Q" and "W" when selected alone, or are associated with the characters "*" and "1" when pressed in combination with key 529. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, the keyboard 502 also includes other special function keys, such as an establish call key 530 that causes a received call to be answered or a new call to be originated; a terminate call key 531 that causes the termination of an active call; a drop down menu key 532 that causes a menu to appear within the display 501; a backward navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 500 to navigate to a predetermined network address; or other keys that provide for multiple-way navigation, application selection, and power and volume control.

The user uses the pointing device 504 to select and adjust graphics and text objects displayed on the display 501 as part of the interaction with and control of the device 500 and the applications invoked on the device 500. The pointing device 504 is any appropriate type of pointing device, and may be a joystick, a trackball, a touch-pad, a camera, a voice input device, a touch screen device implemented in combination with the display 501, or any other input device.

The antenna 505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), SGPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or EvolutionData Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285™ transceiver and PM7540™ power management circuit.

The wireless or wired computer network connection 506 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 5.0 connector), a near field communications (NFC) connector, an orthogonal frequency division multiplexing (OFDM) ultra wide band (UWB) wireless connector, a timemodulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 506 and the antenna 505 are integrated into a single component.

The camera 507 allows the device 500 to capture digital images, and may be a scanner, a digital still camera, a digital video camera, other digital input device. In one example implementation, the camera 507 is a 5 mega-pixel (MP) camera that utilizes a complementary metal-oxide semiconductor (CMOS).

The microphone 509 allows the device 500 to capture sound, and may be an omni-directional microphone, a unidirectional microphone, a bi-directional microphone, a shotgun microphone, or other type of apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 5 as a handheld device, in further implementations the device 500 may be a laptop, a workstation, a midrange computer, a mainframe, an embedded system, telephone, desktop PC, a tablet computer, a PDA, or other type of computing device.

Figure 6:
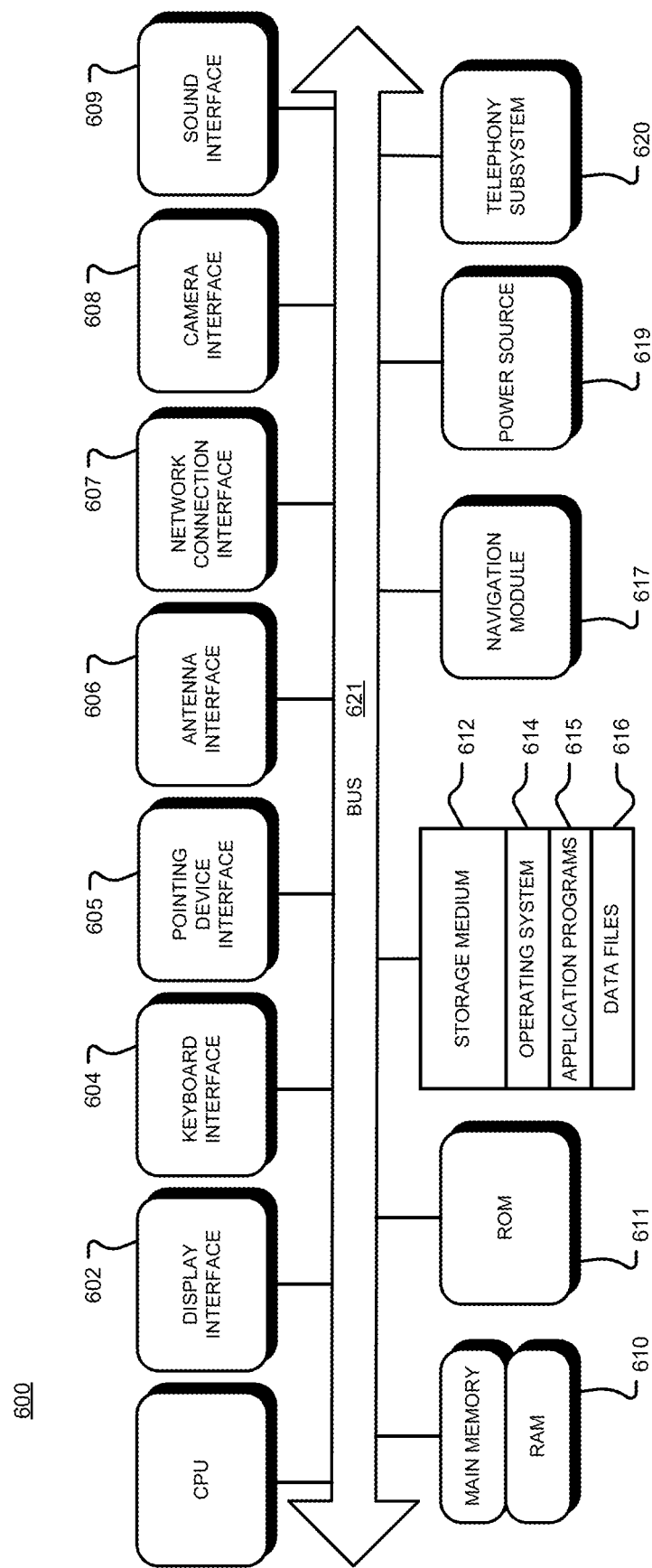
FIG. 6 is a block diagram illustrating the internal architecture of the device of FIG. 5.

FIG. 6 is a block diagram illustrating an internal architecture 600 of the device 500. The architecture includes a central processing unit (CPU) 601 where the computer instructions that comprise an operating system or an application are processed; a display interface 602 that provides a communication interface and processing functions for rendering video, graphics, images, and texts on the display 501, provides a set of built-in controls (such as buttons, text and lists), and supports diverse screen sizes; a keyboard interface 604 that provides a communication interface to the keyboard 502; a pointing device interface 605 that provides a communication interface to the pointing device 504; an antenna interface 606 that provides a communication interface to the antenna 505; a network connection interface 607 that provides a communication interface to a network over the computer network connection 506; a camera interface 608 that provides a communication interface and processing functions for capturing digital images from the camera 507; a sound interface 609 that provides a communication interface for converting sound into electrical signals using the microphone 509 and for converting electrical signals into sound using the speaker 510; a random access memory (RAM) 610 where computer instructions and data are stored in a volatile memory device for processing by the CPU 601; a read-only memory (ROM) 611 where invariant low-level systems code or data for basic system functions such as basic input and output (I/O), startup, or reception of keystrokes from the keyboard 502 are stored in a non-volatile memory device; a storage medium 612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 614, application programs 615 (including, for example, a web browser application, a widget or gadget engine, and or other applications, as necessary) and data files 616 are stored; a navigation module 617 that provides a real-world or relative position or geographic location of the device 500; a power source 619 that provides an appropriate alternating current (AC) or direct current (DC) to power components; and a telephony subsystem 620 that allows the device 500 to transmit and receive sound over a telephone network. The constituent devices and the CPU 601 communicate with each other over a bus 621.

The CPU 601 can be one of a number of computer processors. In one arrangement, the computer CPU 601 is more than one processing unit. The RAM 610 interfaces with the computer bus 621 so as to provide quick RAM storage to the CPU 601 during the execution of software programs such as the operating system application programs, and device drivers. More specifically, the CPU 601 loads computer-executable process steps from the storage medium 612 or other media into a field of the RAM 610 in order to execute software programs. Data is stored in the RAM 610, where the data is accessed by the computer CPU 601 during execution. In one example configuration, the device 500 includes at least 128 MB of RAM, and 256 MB of flash memory.

The storage medium 612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500, or to upload data onto the device 500.

A computer program product is tangibly embodied in storage medium 612, a machine-readable storage medium. The computer program product includes instructions that, when read by a machine, operate to cause a data processing apparatus to store image data in the mobile device. In some embodiments, the computer program product includes instructions that generate notifications about alerts such as newly arriving messages on the device.

The operating system 614 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 614 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON FLASH LITE, or MICROSOFT .NET Compact, or another appropriate environment.

The device stores computer-executable code for the operating system 614, and the application programs 615 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 615 may also include a widget or gadget engine, such as a TAFRI widget engine, a MICROSOFT gadget engine such as the WINDOWS SIDEBAR gadget engine or the KAPSULES gadget engine, a YAHOO! widget engine such as the KONFABULTOR widget engine, the APPLE DASHBOARD widget engine, the GOOGLE gadget engine, the KLIPFOLIO widget engine, an OPERA widget engine, the WIDSETS widget engine, a proprietary widget or gadget engine, or other widget or gadget engine the provides host system software for a physically-inspired applet on a desktop.

Although it is possible to provide for notifications and interactions with messages and other events using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 617 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 617 may also be used to measure angular displacement, orientation, or velocity of the device 500, such as by using one or more accelerometers.

Figure 7:
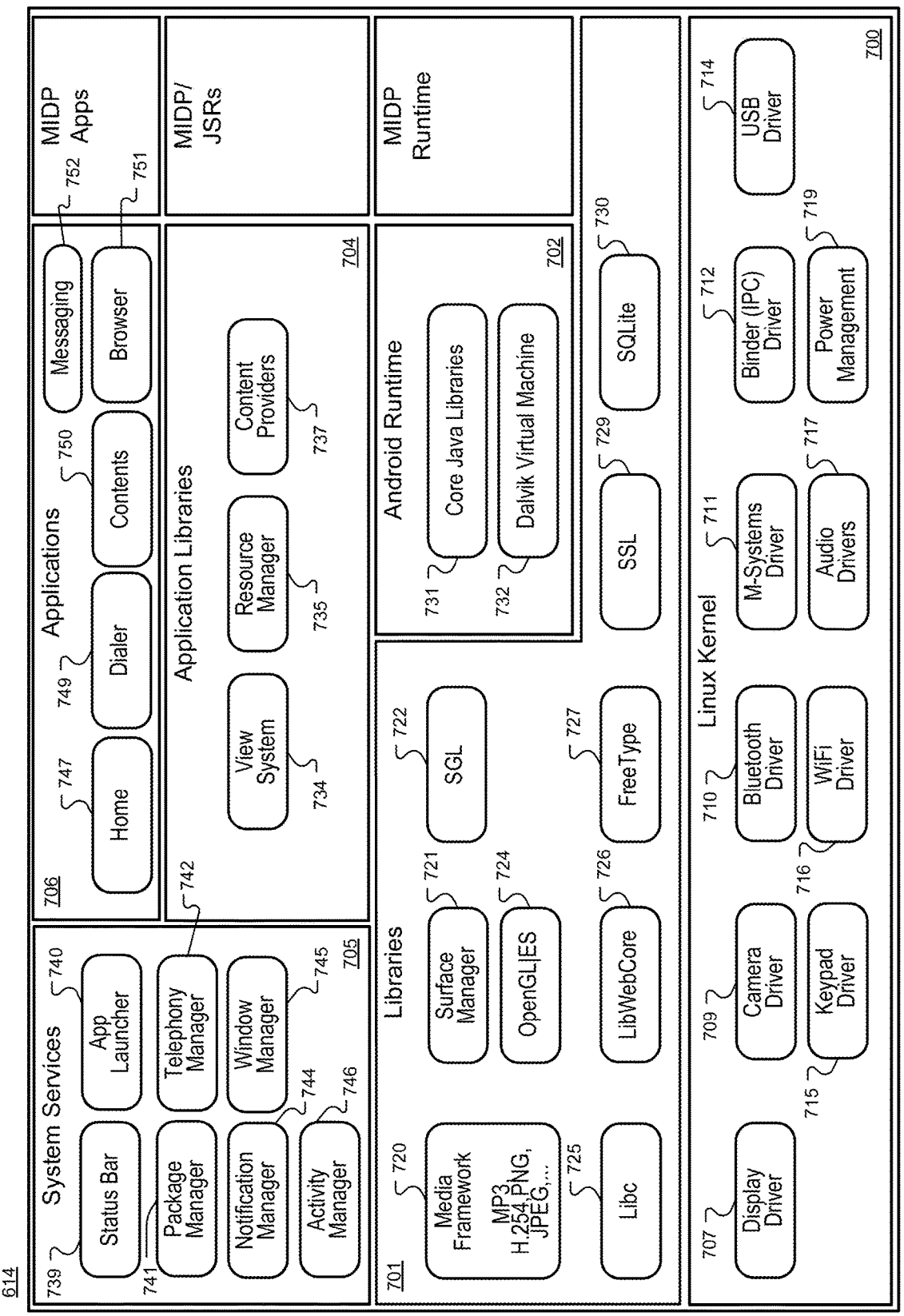
FIG. 7 is a block diagram illustrating exemplary components of the operating system used by the device of FIG. 5.

FIG. 7 is a block diagram illustrating exemplary components of the operating system 614 used by the device 500, in the case where the operating system 614 is the GOOGLE mobile device platform. The operating system 614 invokes multiple processes, while ensuring that the associated phone application is responsive, and that wayward applications do not cause a fault (or "crash") of the operating system. Using task switching, the operating system 614 allows for the switching of applications while on a telephone call, without losing the state of each associated application. The operating system 614 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 614 can generally be organized into six components: a kernel 700, libraries 701, an operating system runtime 702, application libraries 704, system services 705, and applications 706. The kernel 700 includes a display driver 707 that allows software such as the operating system 614 and the application programs 715 to interact with the display 501 via the display interface 602, a camera driver 709 that allows the software to interact with the camera 507; a BLUETOOTH driver 710; a M-Systems driver 711; a binder (IPC) driver 712, a USB driver 714 a keypad driver 715 that allows the software to interact with the keyboard 502 via the keyboard interface 604; a WiFi driver 716; audio drivers 717 that allow the software to interact with the microphone 509 and the speaker 510 via the sound interface 609; and a power management component 719 that allows the software to interact with and manage the power source 719.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 701 include a media framework 720 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 721; a simple graphics library (SGL) 722 for two-dimensional application drawing; an Open Graphics Library for Embedded Systems (OpenGL ES) 724 for gaming and three-dimensional rendering; a C standard library (LIBC) 725; a LIBWEBCORE library 726; a FreeType library 727; an SSL 729; and an SQLite library 730.

The operating system runtime 702 includes core JAVA libraries 731, and a Dalvik virtual machine 732. The Dalvik virtual machine 732 is a custom, virtual machine that runs a customized file format (.DEX).

The operating system 614 can also include Mobile Information Device Profile (MIDP) components such as the MIDP JAVA Specification Requests (JSRs) components, MIDP runtime, and MIDP applications as shown in FIG. 7. The MIDP components can support MIDP applications running on the device 500.

With regard to graphics rendering, a system-wide composer manages surfaces and a frame buffer and handles window transitions, using the OpenGL ES 724 and two-dimensional hardware accelerators for its compositions.

The Dalvik virtual machine 732 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 704 include a view system 734, a resource manager 735, and content providers 737. The system services 705 includes a status bar 739; an application launcher 740; a package manager 741 that maintains information for all installed applications; a telephony manager 742 that provides an application level JAVA interface to the telephony subsystem 620; a notification manager 744 that allows all applications access to the status bar and on-screen notifications, such as in the manners discussed in the embodiments above; a window manager 745 that allows multiple applications with multiple windows to share the display 501; and an activity manager 746 that runs each application in a separate process, manages an application life cycle, and maintains a cross-application history.

The applications 706 include a home application 747, a dialer application 749, a contacts application 750, a browser application 751, and a messaging application 752. The messaging application 752 may receive and send messages by a number of mechanisms such as e-mail, voice mail, and text message, and may interaction with the notification manager 744 to alert a user when new messages arrive.

The telephony manager 742 provides event notifications (such as phone state, network state, Subscriber Identity Module (SIM) status, or voicemail status), allows access to state information (such as network information, SIM information, or voicemail presence), initiates calls, and queries and controls the call state. The browser application 751 renders web pages in a full, desktop-like manager, including navigation functions. Furthermore, the browser application 751 allows single column, small screen rendering, and provides for the embedding of HTML views into other applications.

Figure 8:
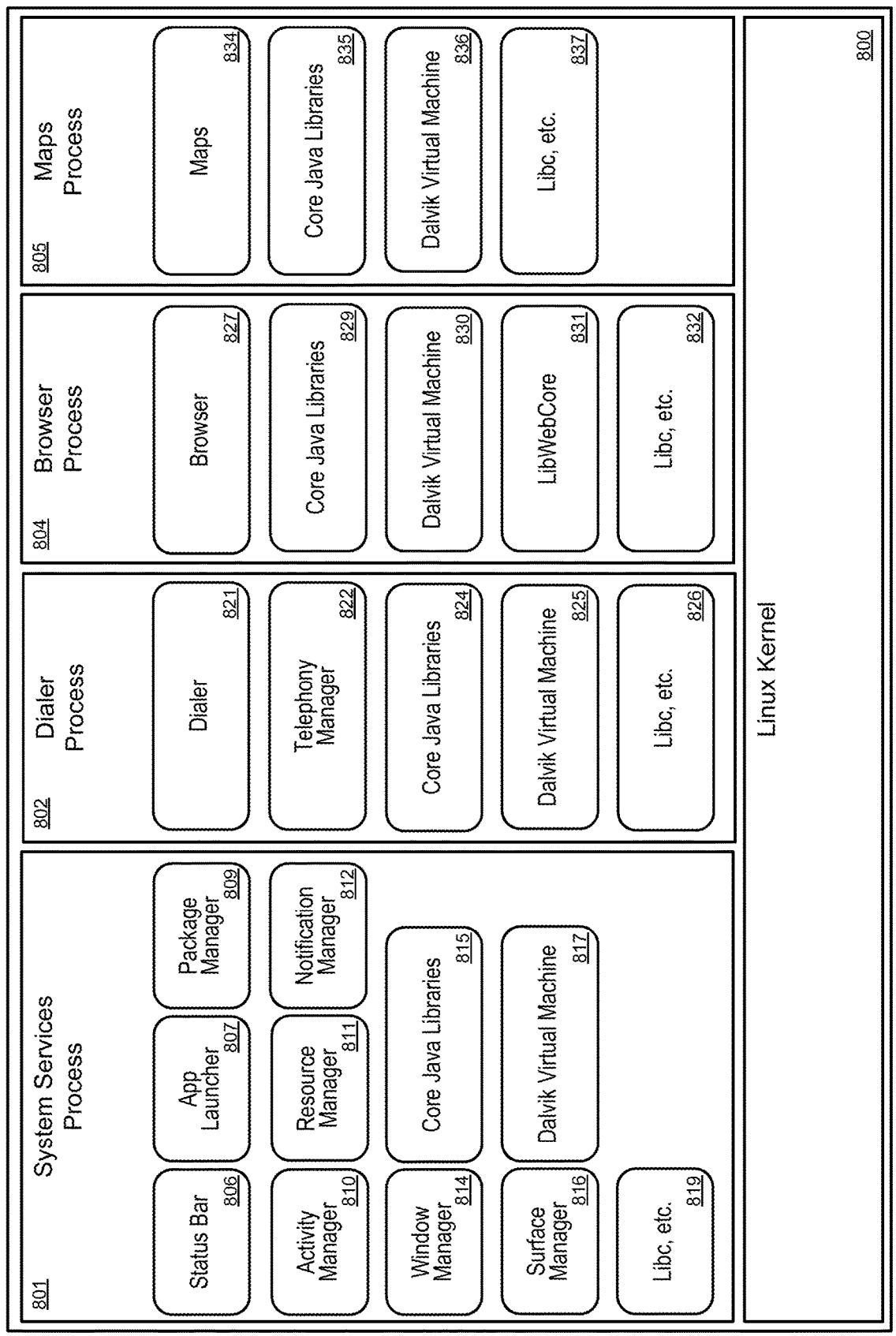
FIG. 8 is a block diagram illustrating exemplary processes implemented by the operating system kernel of FIG. 7.

FIG. 8 is a block diagram illustrating exemplary processes implemented by the operating system kernel 800. Generally, applications and system services run in separate processes, where the activity manager 746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 816, the window manager 814, or the activity manager 810 can be continuously executed while the device 500 is powered. Additionally, some application-specific process can also be persistent. For example, processes associated with the dialer application 821, may also be persistent.

The processes implemented by the operating system kernel 800 may generally be categorized as system services processes 801, dialer processes 802, browser processes 804, and maps processes 805. The system services processes 801 include status bar processes 806 associated with the status bar 739; application launcher processes 807 associated with the application launcher 740; package manager processes 809 associated with the package manager 741; activity manager processes 810 associated with the activity manager 746; resource manager processes 811 associated with a resource manager 811 that provides access to graphics, localized strings, and XML layout descriptions; notification manager processes 812 associated with the notification manager 744; window manager processes 814 associated with the window manager 745; core JAVA libraries processes 815 associated with the core JAVA libraries 731; surface manager processes 816 associated with the surface manager 721; Dalvik virtual machine processes 817 associated with the Dalvik virtual machine 732, and LIBC processes 819 associated with the LIBC library 725.

The dialer processes 802 include dialer application processes 821 associated with the dialer application 749; telephony manager processes 822 associated with the telephony manager 742; core JAVA libraries processes 824 associated with the core JAVA libraries 731; Dalvik virtual machine processes 825 associated with the Dalvik Virtual machine 732; and LIBC processes 826 associated with the LIBC library 725. The browser processes 804 include browser application processes 827 associated with the browser application 751; core JAVA libraries processes 829 associated with the core JAVA libraries 731; Dalvik virtual machine processes 830 associated with the Dalvik virtual machine 732; LIBWEBCORE processes 831 associated with the LIBWEBCORE library 726; and LIBC processes 832 associated with the LIBC library 725.

The maps processes 805 include maps application processes 834, core JAVA libraries processes 835, Dalvik virtual machine processes 836, and LIBC processes 837. Notably, some processes, such as the Dalvik virtual machine processes, may exist within one or more of the systems services processes 801, the dialer processes 802, the browser processes 804, and the maps processes 805.

Figure 9:
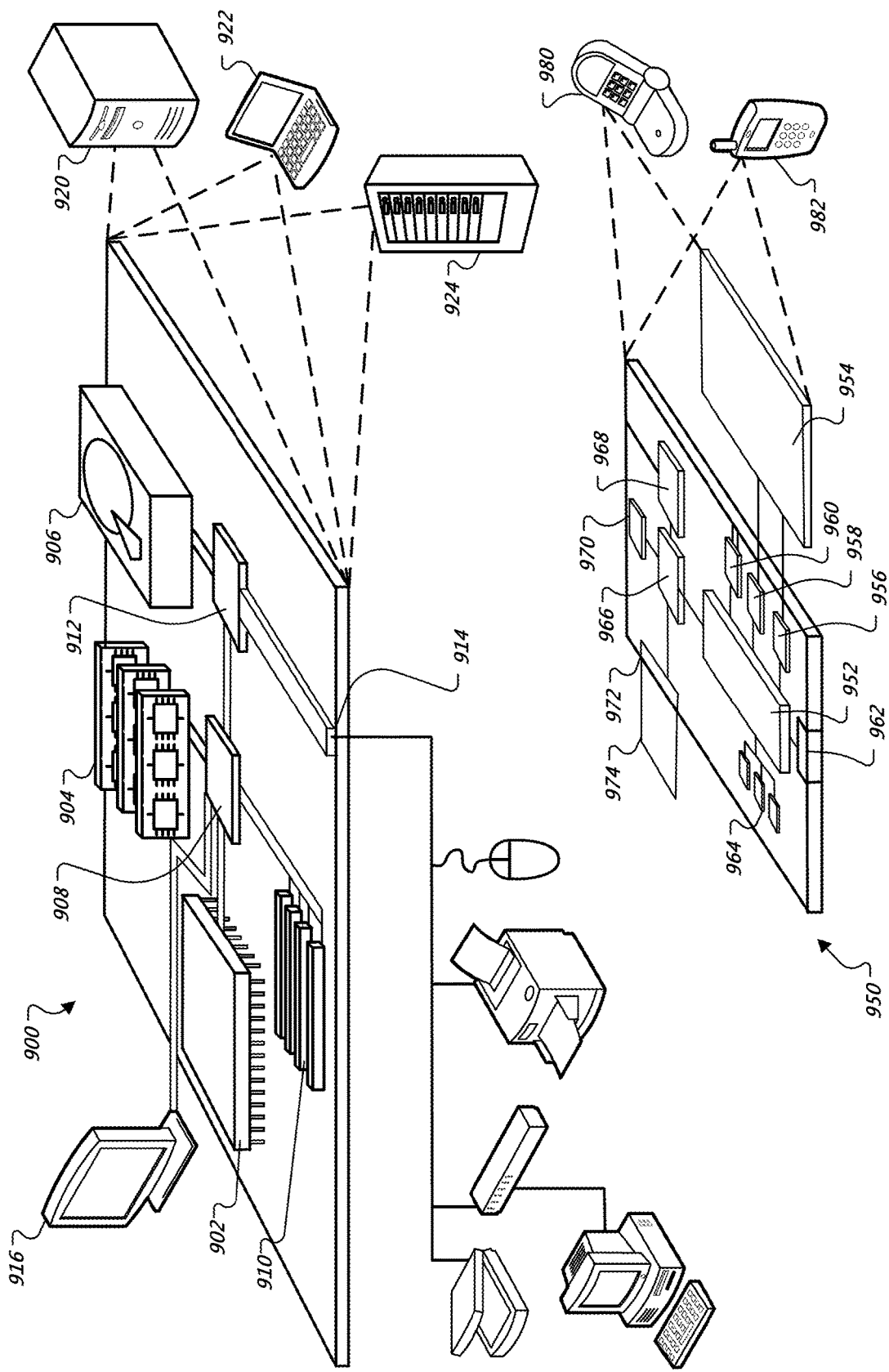
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:
1. A method comprising:
displaying, by a touchscreen display of a mobile device, a graphical user interface that includes a status area along a top edge of the touchscreen display and a central zone located adjacent to and below the status area, wherein the status area includes one or more of an indication of a battery level of a battery of the mobile device or a wireless signal strength;
detecting, by the touchscreen display, a user input initiated within the status area of the graphical user interface and including a dragging manipulation from the status area of the graphical user interface and across the graphical user interface away from the top edge of the touchscreen display;
while the touchscreen display detects the dragging manipulation, displaying, by the touchscreen display, an animation of a panel visually expanding across the graphical user interface from the top edge of the touchscreen display in a downward direction into the central zone of the graphical user interface in coordination with the dragging manipulation; and displaying, by the touchscreen display, the panel within at least the central zone of the graphical user interface, the panel including detail regarding a plurality of alert events for the mobile device, wherein at least one of the plurality of alert events corresponds to a message received by the mobile device, and wherein detail regarding the message includes at least a portion of text included in the message.

2. The method of claim 1, wherein displaying the animation of the panel visually expanding across the graphical user interface includes visually obscuring a graphical user interface of a currently executing application, the graphical user interface of the currently executing application being at least particularly obscured by the panel as the panel visually expands across the graphical user interface from the top edge of the touchscreen display in the downward direction.

3. The method of claim 1, wherein plurality of alert events further includes at least one additional message received by the mobile device and corresponding to one of an electronic mail, chat, a text message, a voice mail, or a posting of data to a shared networked data source.

4. The method of claim 1, wherein the panel includes a list of messages from a plurality of messaging applications, and wherein the message is included in the list of messages.

5. The method of claim 1, further comprising:
grouping, by the mobile device and based on a type of each of the plurality of alert events, the plurality of alert events into one or more subgroups, wherein the message is included in a first subgroup from the one or more subgroups, wherein the panel includes an indication of the first subgroup and the detail regarding the message.

6. The method of claim 5, wherein the panel includes a numerical indicator of a number of events included in each of the one or more subgroups.

7. The method of claim 1, wherein the user input is a first user input, wherein the panel includes selectable control, and wherein the method further comprises; detecting, by the touchscreen display, a second user input at a location of the selectable control; and responsive to detecting the second user input, clearing, by the mobile device, at least a portion of the plurality of alert events.

8. The method of claim 1, further comprising:
receiving, by the mobile device, an additional alert event;
determining, by the mobile device, whether there have been prior alert events since the plurality of alert events was last cleared; and
responsive to determining that there have been prior alert events:
determining whether the plurality of alert events includes one or more alert events having a same type as the additional alert event; and
responsive to determining that the plurality of alert events includes the one or more alert events having the same type as the additional alert event, grouping, by the mobile device, the additional alert event and the one or more alert events having the same type into a subgroup of the plurality of alert events.

9. A device comprising:
a touchscreen display;
one or more processors; and
a memory that stores instructions that, when executed by the one or more processors, cause the one or more processors to:
output, for display by the touchscreen display, a graphical user interface that includes a status area along a top edge of the touchscreen display and a central zone located adjacent to and below the status area, wherein the status area includes one or more of an indication of a battery level of a battery of the mobile device or a wireless signal strength;
receive an indication of a user input detected by the touchscreen display, the user input initiated within the status area of the graphical user interface and including a dragging manipulation from the status area of the graphical user interface and across the graphical user interface away from the top edge of the touchscreen display;
while the touchscreen display detects the dragging manipulation, output, for display by the touchscreen display, an animation of a panel visually expanding across the graphical user interface from the top edge of the touchscreen display in a downward direction into the central zone of the graphical user interface in coordination with the dragging manipulation; and
output, for display by the touchscreen display, the panel within at least the central zone of the graphical user interface, the panel including detail regarding a plurality of alert events for the mobile device, wherein at least one of the plurality of alert events corresponds to a message received by the mobile device, and wherein detail regarding the message includes at least a portion of text included in the message.

10. The device of claim 9, wherein the panel visually obscures at least a portion of a graphical user interface of an application currently executing at the mobile device.

11. The device of claim 9, wherein plurality of alert events further includes at least one additional message received by the mobile device and corresponding to one of an electronic mail, chat, a text message, a voice mail, or a posting of data to a shared networked data source.

12. The device of claim 9, wherein the panel includes a list of messages from a plurality of messaging applications, and wherein the message is included in the list of messages.

13. The device of claim 9, wherein the instructions further cause the one or more processors to:
group, based on a type of each of the plurality of alert events, the plurality of alert events into one or more subgroups, wherein the message is included in a first subgroup from the one or more subgroups,
wherein the panel includes an indication of the first subgroup and the detail regarding the message.

14. The device of claim 13, wherein the panel includes a numerical indicator of a number of events included in each of the one or more subgroups.

15. The device of claim 9,
wherein the user input is a first user input,
wherein the panel includes selectable control, and
wherein the instructions further cause the one or more processors to:
receive an indication of a second user input detected by the touchscreen display at a location of the selectable control; and
responsive to receiving the indication of the second user input, clear at least a portion of the plurality of alert events.

16. The device of claim 9, wherein the instructions further cause the one or more processors to:
receive an additional alert event;
determine whether there have been prior alert events since the plurality of alert events was last cleared; and
responsive to determining that there have been prior alert events:
determine whether the plurality of alert events includes one or more alert events having a same type as the additional alert event; and
responsive to determining that the plurality of alert events includes the one or more alert events having the same type as the additional alert event, group the additional alert event and the one or more alert events having the same type into a subgroup of the plurality of alert events.

17. A non-transitory computer-readable storage medium encoded with instructions that, when executed, cause one or more processors of a mobile device to:
- output, for display by a touchscreen display of the mobile device, a graphical user interface that includes a status area along a top edge of the touchscreen display and a central zone located adjacent to and below the status area, wherein the status area includes one or more of an indication of a battery level of a battery of the mobile device or a wireless signal strength;
- receive an indication of a user input detected by the touchscreen display, the user input initiated within the status area of the graphical user interface and including a dragging manipulation from the status area of the graphical user interface and across the graphical user interface away from the top edge of the touchscreen display;
- while the touchscreen display detects the dragging manipulation, output, for display by the touchscreen display, an animation of a panel visually expanding across the graphical user interface from the top edge of the touchscreen display in a downward direction into the central zone of the graphical user interface in coordination with the dragging manipulation; and
- output, for display by the touchscreen display, the panel within at least the central zone of the graphical user interface, the panel including detail regarding a plurality of alert events for the mobile device, wherein at least one of the plurality of alert events corresponds to a message received by the mobile device, and wherein detail regarding the message includes at least a portion of text included in the message.

18. The non-transitory computer-readable storage medium of claim 17, wherein the instructions further cause the one or more processors to:
group, based on a type of each of the plurality of alert events, the plurality of alert events into one or more subgroups, wherein the message is included in a first subgroup from the one or more subgroups,
wherein the panel includes an indication of the first subgroup and the detail regarding the message.

19. The non-transitory computer-readable storage medium of claim 17,
wherein the user input is a first user input,
wherein the panel includes selectable control, and
wherein the instructions further cause the one or more processors to:
- receive an indication of a second user input detected by the touchscreen display at a location of the selectable control; and
- responsive to receiving the indication of the second user input, clear at least a portion of the plurality of alert events.

20. The non-transitory computer-readable storage medium of claim 17, wherein the instructions further cause the one or more processors to:
receive an additional alert event;
determine whether there have been prior alert events since the plurality of alert events was last cleared; and
responsive to determining that there have been prior alert events:
- determine whether the plurality of alert events includes one or more alert events having a same type as the additional alert event; and
- responsive to determining that the plurality of alert events includes the one or more alert events having the same type as the additional alert event, group the additional alert event and the one or more alert events having the same type into a subgroup of the plurality of alert events.

* * * * *